(12) United States Patent
Brooks et al.

(10) Patent No.: US 12,321,141 B2
(45) Date of Patent: Jun. 3, 2025

(54) METHOD OF OPTIMIZING CONTROL SIGNALS USED IN OPERATING VEHICLE

(71) Applicant: 3M INNOVATIVE PROPERTIES COMPANY, St. Paul, MN (US)

(72) Inventors: Brian E. Brooks, St. Paul, MN (US); Gilles J. Benoit, Minneapolis, MN (US); Peter O. Olson, Andover, MN (US); Tyler W. Olson, Woodbury, MN (US); Himanshu Nayar, St. Paul, MN (US); Frederick J. Arsenault, Stillwater, MN (US); Nicholas A. Johnson, Burnsville, MN (US); John A. Wheatley, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 303 days.

(21) Appl. No.: 17/436,751

(22) PCT Filed: Sep. 11, 2019

(86) PCT No.: PCT/IB2019/057646
§ 371 (c)(1),
(2) Date: Sep. 7, 2021

(87) PCT Pub. No.: WO2020/188327
PCT Pub. Date: Sep. 24, 2020

(65) Prior Publication Data
US 2022/0176968 A1 Jun. 9, 2022

Related U.S. Application Data

(60) Provisional application No. 62/818,816, filed on Mar. 15, 2019.

(51) Int. Cl.
*B60W 40/064* (2012.01)
*B60W 40/08* (2012.01)
(Continued)

(52) U.S. Cl.
CPC ......... *G05B 13/042* (2013.01); *B60W 40/064* (2013.01); *B60W 40/08* (2013.01);
(Continued)

(58) Field of Classification Search
CPC .. G05B 13/042; G05B 13/021; G05B 13/024; G05B 13/0265; G05B 13/041;
(Continued)

(56) References Cited

U.S. PATENT DOCUMENTS 5,196,997 A 3/1993 Kurtzberg
5,696,884 A * 12/1997 Heckerman ............ G06N 5/022
706/59

(Continued)

FOREIGN PATENT DOCUMENTS

CA 2977272 2/2018
CN 108710289 10/2018
(Continued)

OTHER PUBLICATIONS

Alvarez, "Introduction to Adaptive Experimental Design", Center for Quantitative Sciences, Vanberbilt University School of Medicine, Oct. 12, 2012, 96 pages.
(Continued)

*Primary Examiner* — Sohana Tanju Khayer
*Assistant Examiner* — Dylan M Katz

(57) ABSTRACT

A method of optimizing a plurality of control signals used in operating a vehicle is described. The operation has a plurality of associated measurable parameters. The method includes: for each control signal, selecting a plurality of potential optimum values from a predetermined set; operating the vehicle in at least a first sequence of operation iterations, where for each pair of sequential first and second operation iterations in the first sequence of operation iterations, the potential optimum value of one control signal in
(Continued)

the first operation iteration is replaced in the second operation iteration with a next potential optimum value of the control signal, while the potential optimum values of the remaining control signals are maintained; for each operation iteration, measuring each parameter in the plurality of measurable parameters; and generating confidence intervals for the control signals to determine causal relationships between the control signals and the measurable parameters.

14 Claims, 10 Drawing Sheets

(51) Int. Cl.
| | |
|---|---|
| B60W 40/105 | (2012.01) |
| G05B 13/02 | (2006.01) |
| G05B 13/04 | (2006.01) |
| G05B 19/4065 | (2006.01) |
| G05B 19/418 | (2006.01) |
| G05B 23/02 | (2006.01) |
| G06F 18/21 | (2023.01) |
| G06N 5/043 | (2023.01) |
| G06N 5/046 | (2023.01) |
| G06N 7/01 | (2023.01) |
| G06Q 10/0631 | (2023.01) |
| G06Q 10/0639 | (2023.01) |
| G06Q 30/0202 | (2023.01) |
| G06Q 10/087 | (2023.01) |

(52) U.S. Cl.
CPC ......... *B60W 40/105* (2013.01); *G05B 13/021* (2013.01); *G05B 13/024* (2013.01); *G05B 13/0265* (2013.01); *G05B 13/041* (2013.01); *G05B 19/4065* (2013.01); *G05B 19/41835* (2013.01); *G05B 23/0229* (2013.01); *G05B 23/0248* (2013.01); *G06F 18/2193* (2023.01); *G06N 5/043* (2013.01); *G06N 5/046* (2013.01); *G06N 7/01* (2023.01); *G06Q 10/06315* (2013.01); *G06Q 10/06395* (2013.01); *G06Q 30/0202* (2013.01); *G05B 2219/36301* (2013.01); *G06Q 10/087* (2013.01)

(58) Field of Classification Search
CPC .......... G05B 19/4065; G05B 19/41835; G05B 23/0229; G05B 2219/36301; G05B 23/024; G05B 23/0248; G05B 19/042; B60W 40/064; B60W 40/08; B60W 40/105; G06F 18/2193; G06N 5/043; G06N 5/046; G06N 7/01; G06N 5/01; G06N 3/08; G06N 20/00; G06Q 10/06315; G06Q 10/06395; G06Q 30/0202; G06Q 10/087; G06Q 10/063; Y02P 90/80; Y02P 90/82

See application file for complete search history.

(56) References Cited

U.S. PATENT DOCUMENTS

| | | | |
|---|---|---|---|
| 5,882,774 | A | 3/1999 | Jonza |
| 5,976,424 | A | 11/1999 | Weber |
| 6,151,582 | A | 11/2000 | Huang |
| 6,266,853 | B1 | 7/2001 | Ho |
| 6,594,024 | B1 | 7/2003 | Singh |
| 6,952,688 | B1 | 10/2005 | Goldman |
| 7,461,040 | B1 | 12/2008 | Goldman |
| 7,680,752 | B1 | 3/2010 | Clune, III |
| 9,679,258 | B2 | 6/2017 | Mnih |
| 9,947,018 | B2 | 4/2018 | Brooks |
| 10,133,983 | B1 | 11/2018 | Chelian |
| 10,190,792 | B2 | 1/2019 | Jacobson |
| 10,229,026 | B1 | 3/2019 | Vijendra |
| 10,628,733 | B2 | 4/2020 | Schaul |
| 11,113,605 | B2 | 9/2021 | Czarnecki |
| 2001/0047846 | A1 | 12/2001 | Currens |
| 2002/0019695 | A1* | 2/2002 | Pflugl .................. G05B 13/021 701/102 |
| 2002/0150866 | A1* | 10/2002 | Perry ...................... F41G 7/006 434/11 |
| 2004/0099993 | A1 | 5/2004 | Jackson |
| 2004/0230397 | A1 | 11/2004 | Chadwick |
| 2006/0242288 | A1 | 10/2006 | Masurkar |
| 2006/0274244 | A1 | 12/2006 | Battiato |
| 2007/0031853 | A1 | 2/2007 | Stanton |
| 2007/0156294 | A1 | 7/2007 | Tipping |
| 2007/0156382 | A1 | 7/2007 | Graham, II |
| 2007/0219736 | A1 | 9/2007 | Okita |
| 2008/0121729 | A1 | 5/2008 | Gray |
| 2009/0006125 | A1 | 1/2009 | Angell |
| 2009/0070056 | A1* | 3/2009 | Vocali .................... G01C 17/28 702/92 |
| 2009/0204267 | A1 | 8/2009 | Sustaeta |
| 2010/0103521 | A1 | 4/2010 | Smith |
| 2010/0191361 | A1 | 7/2010 | McCready |
| 2010/0201242 | A1 | 8/2010 | Liu |
| 2010/0330155 | A1 | 12/2010 | Berry |
| 2011/0022193 | A1 | 1/2011 | Panaitescu |
| 2011/0112997 | A1 | 5/2011 | Sabe |
| 2012/0010867 | A1 | 1/2012 | Eder |
| 2013/0038939 | A1 | 2/2013 | Walker, Jr. |
| 2013/0197675 | A1 | 8/2013 | McCarthy |
| 2013/0197698 | A1 | 8/2013 | Shah |
| 2014/0025358 | A1 | 1/2014 | Hill |
| 2014/0289174 | A1 | 9/2014 | Statnikov |
| 2014/0379101 | A1 | 12/2014 | Buchmann |
| 2015/0142704 | A1 | 5/2015 | London |
| 2016/0041541 | A1 | 2/2016 | Drees |
| 2016/0147203 | A1 | 5/2016 | Di Cairano |
| 2016/0287693 | A1 | 10/2016 | Norman |
| 2016/0350796 | A1 | 12/2016 | Arsenault |
| 2017/0031354 | A1 | 2/2017 | Tyber |
| 2017/0050590 | A1 | 2/2017 | List |
| 2017/0102678 | A1 | 4/2017 | Nixon |
| 2017/0109642 | A1 | 4/2017 | Kawale |
| 2017/0205781 | A1* | 7/2017 | Brooks ............... G05B 13/045 |
| 2017/0278114 | A1 | 9/2017 | Renders |
| 2017/0359418 | A1* | 12/2017 | Sustaeta ............ G05B 13/0285 |
| 2018/0121817 | A1 | 5/2018 | Datta |
| 2018/0181808 | A1 | 6/2018 | Sridharan |
| 2018/0242429 | A1 | 8/2018 | Ashdown |
| 2018/0364657 | A1 | 12/2018 | Luo |
| 2019/0026754 | A1 | 1/2019 | Miltonberger |
| 2019/0078801 | A1 | 3/2019 | Turney |
| 2019/0244110 | A1 | 8/2019 | Qiu |
| 2019/0299997 | A1* | 10/2019 | Schlegel ............ B60W 40/068 |
| 2020/0049089 | A1* | 2/2020 | Charbonnel .......... G05B 17/02 |

FOREIGN PATENT DOCUMENTS

| | | |
|---|---|---|
| EP | 3316140 | 5/2018 |
| JP | 2006-277370 | 10/2006 |
| WO | WO 2005-124580 | 12/2005 |
| WO | WO 2012-151499 | 11/2012 |
| WO | WO 2013-130956 | 9/2013 |
| WO | WO 2016-086665 | 6/2016 |
| WO | WO 2020-109937 | 6/2020 |
| WO | WO 2020-188328 | 9/2020 |
| WO | WO 2020-188329 | 9/2020 |
| WO | WO 2020-188330 | 9/2020 |
| WO | WO 2020-188331 | 9/2020 |
| WO | WO 2020-188333 | 9/2020 |
| WO | WO 2020-188334 | 9/2020 |
| WO | WO 2020-188335 | 9/2020 |
| WO | WO 2020-188336 | 9/2020 |
| WO | WO 2020-188338 | 9/2020 |
| WO | WO 2020-188341 | 9/2020 |
| WO | WO 2020-190324 | 9/2020 |

(56) References Cited

FOREIGN PATENT DOCUMENTS

| WO | WO 2020-190325 | 9/2020 |
|----|----------------|--------|
| WO | WO 2020-190326 | 9/2020 |
| WO | WO 2020-190327 | 9/2020 |
| WO | WO 2020-190328 | 9/2020 |

OTHER PUBLICATIONS

Agrawal, "Analysis of Thompson Sampling for the Multi-armed Bandit Problem", Conference on Learning Theory, 2012, vol. 23, pp. 39.1-39.26.
Auer, "Finite-time Analysis of the Multiarmed Bandit Problem", Machine Learning, 2002, vol. 47, pp. 235-256.
Cao, "Nearly Optimal Adaptive Procedure with Change Detection for Piecewise-Stationary Bandit", International Conference on Artificial Intelligence and Statistics, 2019, vol. 89, 10 pages.
Cesa-Bianchi, "Boltzmann Exploration Done Right", Conference on Neural Information Processing Systems, 2017, pp. 1-10.
Gomes, "Machine-Learning Maestro Michael Jordon on the Delusions of Big Data and Other Huge Engineering Efforts", IEEE Spectrum, Oct. 2014, 10 pages.
Jordan, "Machine Learning: Trends, Perspectives, and Prospects", Journal of Science, Jul. 17, 2015, vol. 349, No. 6245, pp. 255-260.
Li, "A Contextual-Bandit Approach to Personalized News Article Recommendation", International World Wide Web Conference (WWW), 2010, pp. 661-670.
Li, "Knowledge Discovery from Observational Data for Process Control using Causal Bayesian Networks", IIE Transactions, 2007, vol. 39, pp. 681-690.
Pike-Burke, "Bandits with Delayed, Aggregated Anonymous Feedback", International Conference on Machine Learning, 2018, 9 pages.
Shi, "Quality Control and Improvement for Multistage Systems: A survey", IIE Transactions, 2009, vol. 41, No. 9, pp. 744-753.
International Search Report for PCT International Application No. PCT/IB2019/057646, mailed on Dec. 17, 2019, 4 pages.
International Search Report for PCT International Application No. PCT/IB2019/058423 mailed on Jan. 17, 2020, 3 pages.
International Search Report for PCT International Application No. PCT/IB2019/058426 mailed on, Jan. 17, 2020, 3 pages.
International Search Report for PCT International Application No. PCT/IB2019/058424 mailed on Jan. 17, 2020, 3 pages.
International Search Report for PCT International Application No. PCT/IB2019/057662 mailed on May 1, 2020, 3 pages.
International Search Report for PCT International Application No. PCT/IB2019/058438 mailed on Apr. 24, 2020, 3 pages.
International Search Report for PCT International Application No. PCT/US2019/050703 mailed on Dec. 4, 2019, 3 pages.
International Search Report for PCT International Application No. PCT/US2019/050695 mailed on Nov. 27, 2019, 3 pages.
International Search Report for PCT International Application No. PCT/IB2019/057648, mailed on Jan. 24, 2020, 7 pages.
International Search Report for PCT International Application No. PCT/IB2019/058428, mailed on Jan. 17, 2020, 3 pages.
International Search Report for PCT International Application No. PCT/IB2019/059227, mailed on Jan. 27, 2020, 3 pages.
International Search Report for PCT International Application No. PCT/IB2019/050701, mailed on Jan. 13, 2020, 5 pages.
International Search Report for PCT International Application No. PCT/IB2019/057664, mailed on May 4, 2020, 3 pages.
International Search Report for PCT International Application No. PCT/US2019/050699, mailed on Dec. 5, 2019, 3 pages.
International Search Report for PCT International Application No. PCT/US2019/050691, mailed on Dec. 11, 2019, 3 pages.
International Search Report for PCT International Application No. PCT/IB2019/057673, mailed on May 12, 2020, 2 pages.
Ling et al., "Integrative Experimental Instructions for Rail Transit Operation and Management," published by Shanghai: Tongji University Press, including English Translation, 19 pages, May 2017.
Xiaoming et al., "Research on the Cultivation System of Innovation Ability for College Students and Empirical Analysis of Mechanical Engineering," Guidance and Research Series on Science and Technology Innovation Activities for College Students, published by Wuhan: Huazhong University of Science and Technology Press, including English Translation, 22 pages, Dec. 2013.

* cited by examiner

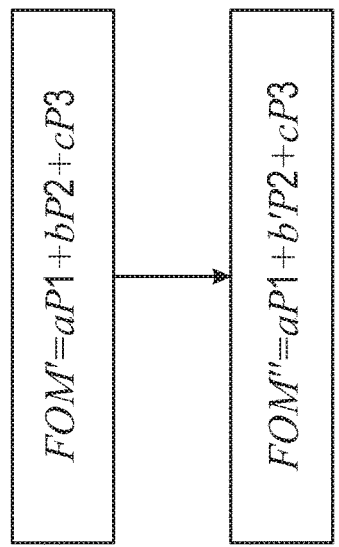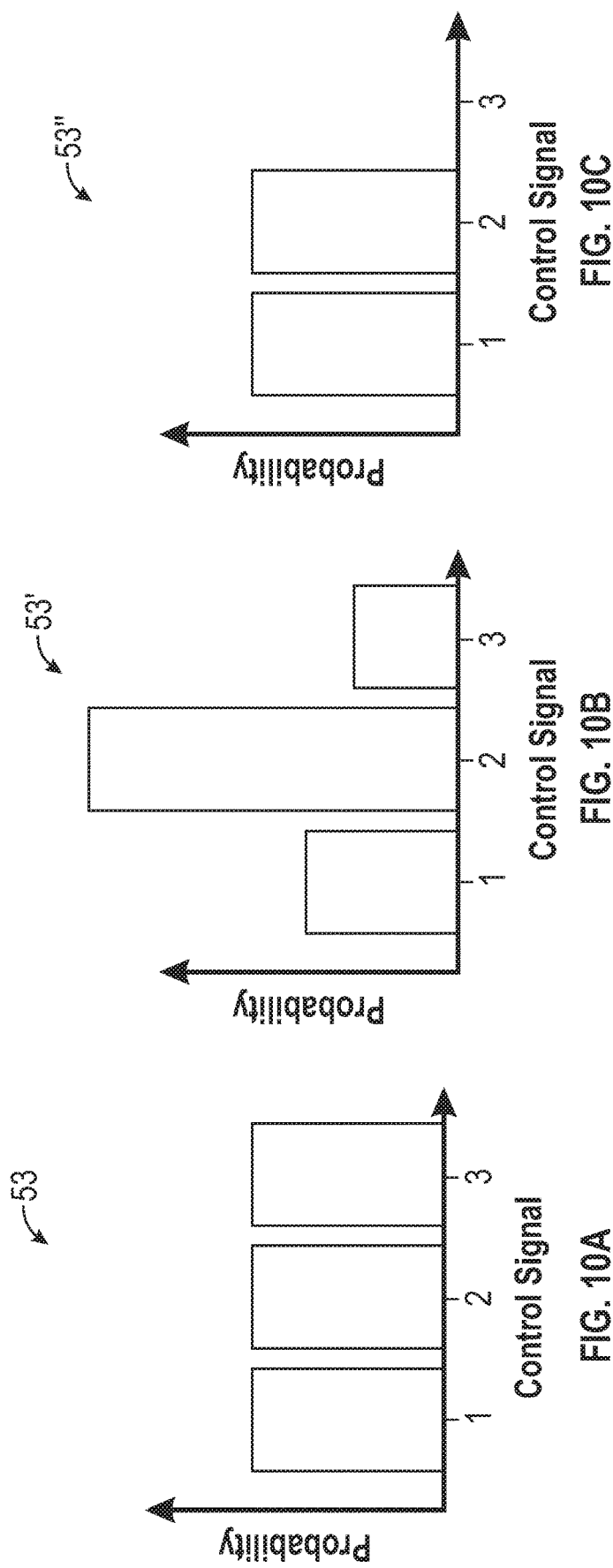

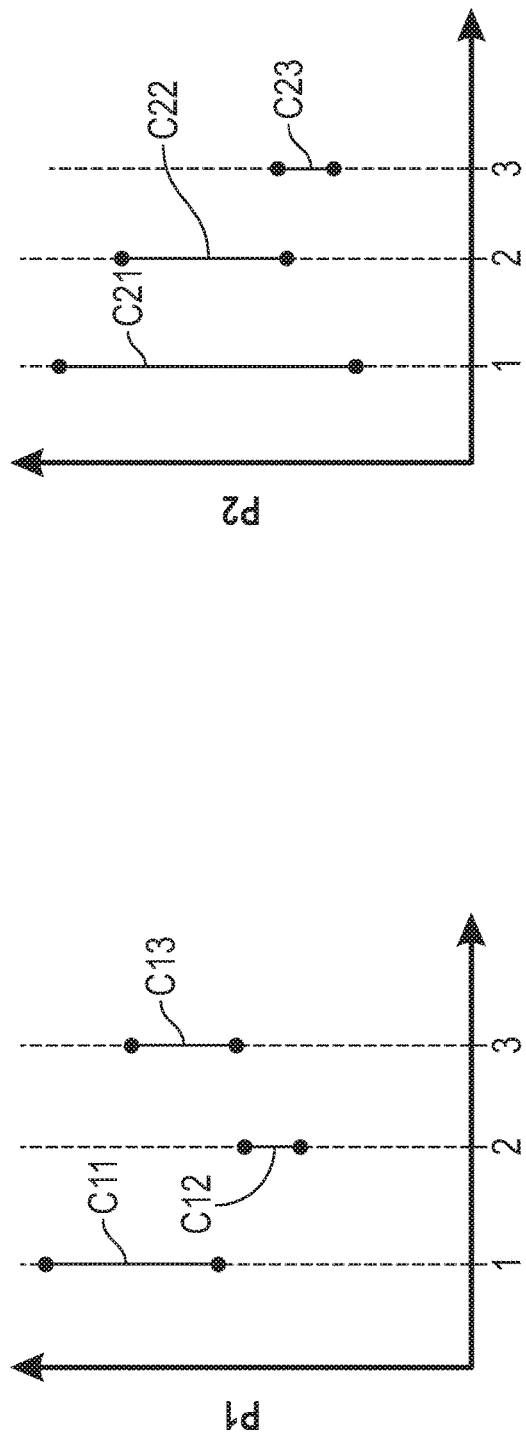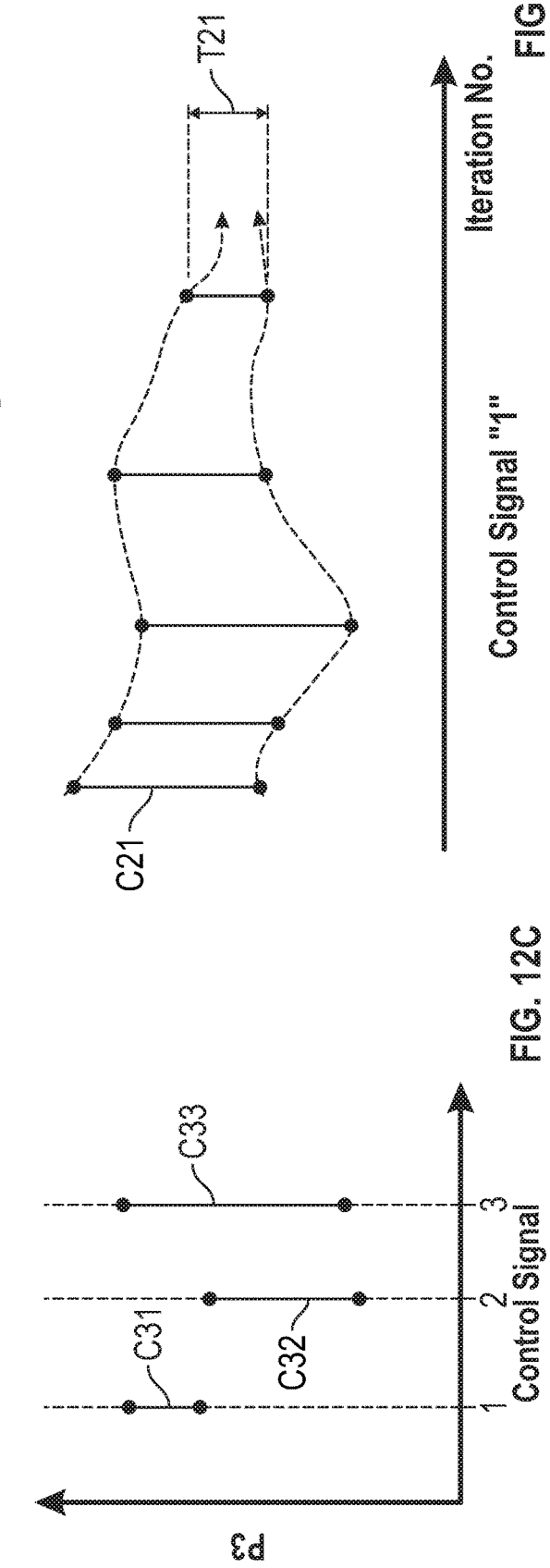

METHOD OF OPTIMIZING CONTROL SIGNALS USED IN OPERATING VEHICLE

CROSS REFERENCE TO RELATED APPLICATIONS

This application is a national stage filing under 35 U.S.C. 371 of PCT/IB2019/057646, filed Sep. 11, 2019, which claims the benefit of U.S. Application No. 62/818,816, filed Mar. 15, 2019, the disclosures of which are incorporated by reference in their entireties herein.

BACKGROUND

A vehicle can include a control system which includes Electronic Control Units (ECUs) which receive sensor data and provide control signals for controlling various aspects of the operation of the vehicle.

SUMMARY

Methods of optimizing control signals used in operating a vehicle, methods of operating a vehicle, and vehicles configured to implement the methods are described.

In some aspects of the present description, a method of optimizing a plurality of control signals used in operating a vehicle is provided. The operation can have a plurality of associated measurable parameters. The method can include: for each control signal, selecting a plurality of potential optimum values from a predetermined set of potential optimum values for the control signal, and arranging the potential optimum values in a predetermined sequence; operating the vehicle in at least a first sequence of operation iterations, where for each pair of sequential first and second operation iterations in the first sequence of operation iterations, the potential optimum value of one selected control signal in the first operation iteration is replaced in the second operation iteration with the next potential optimum value of the selected control signal in the corresponding predetermined sequence of the potential optimum values, while the potential optimum values of the remaining control signals in the first operation iteration are maintained in the second operation iteration; for each operation iteration in at least the first sequence of operation iterations, measuring each parameter in the plurality of measurable parameters; and generating confidence intervals for the control signals to determine causal relationships between the control signals and the measurable parameters.

In some aspects of the present description, a method of optimizing a plurality of control signals used in operating a vehicle is provided. The operation can have a plurality of associated measurable parameters. The method can include: for each control signal, selecting a plurality of potential optimum values from a predetermined set of potential optimum values for the control signal; operating the vehicle in at least a first sequence of operation iterations, where for each pair of sequential first and second operation iterations in the first sequence of operation iterations, the potential optimum value of one control signal in the first operation iteration is replaced in the second operation iteration with another potential optimum value of the one control signal in the corresponding plurality of potential optimum values, while the potential optimum values of the remaining control signals in the first operation iteration are maintained in the second operation iteration; receiving at least one measured value for at least one measurable parameter of at least one other vehicle while operating the vehicle; for each operation iteration in at least the first sequence of operation iterations, measuring each parameter in the plurality of measurable parameters; and generating confidence intervals for the control signals to determine causal relationships between the control signals and the measurable parameters.

In some aspects of the present description, a method of determining optimum values for a plurality of control signals used in operating a vehicle and operating within an optimum operational range is provided. The method can include: receiving a set of operating constraints for the vehicle; generating expected optimum values within an expected optimum operational range based on the received set of operating constraints; and iteratively generating control signal values within corresponding operational ranges, such that for at least one iteration, at least one of the control signal values is different than the corresponding control signal value in a previous iteration, and at least one, but not all, of the control signal values is outside the operational range in a previous iteration.

In some aspects of the present description, a method of operating a vehicle is provided. The operation of the vehicle can use a plurality of control signals and have a plurality of associated measurable parameters. The method can include optimizing the plurality of control signals. The optimization of the plurality of control signals can include: for each control signal, selecting a plurality of potential optimum values from a predetermined set of potential optimum values for the control signal, and arranging the potential optimum values in a predetermined sequence; operating the vehicle in at least a first sequence of operation iterations, where for each pair of sequential first and second operation iterations in the first sequence of operation iterations, the potential optimum value of one selected control signal in the first operation iteration is replaced in the second operation iteration with the next potential optimum value of the selected control signal in the corresponding predetermined sequence of the potential optimum values, while the potential optimum values of the remaining control signals in the first operation iteration are maintained in the second operation iteration; for each operation iteration in at least the first sequence of operation iterations, measuring each parameter in the plurality of measurable parameters; and generating confidence intervals for the control signals to determine causal relationships between the control signals and the measurable parameters. The method can include operating the vehicle using at least the control signals determined by the causal relationships to causally affect at least one of the measurable parameters.

In some aspects of the present description, a method of operating a vehicle is provided. The operation of the vehicle can use a plurality of control signals and have a plurality of associated measurable parameters. The method can include optimizing the plurality of control signals. The optimization of the plurality of control signals can include: for each control signal, selecting a plurality of potential optimum values from a predetermined set of potential optimum values for the control signal; operating the vehicle in at least a first sequence of operation iterations, where for each pair of sequential first and second operation iterations in the first sequence of operation iterations, the potential optimum value of one control signal in the first operation iteration is replaced in the second operation iteration with another potential optimum value of the one control signal in the corresponding plurality of potential optimum values, while the potential optimum values of the remaining control signals in the first operation iteration are maintained in the second operation iteration; receiving at least one measured value for at least one measurable parameter of at least one other vehicle while operating the vehicle; for each operation iteration in at least the first sequence of operation iterations, measuring each parameter in the plurality of measurable parameters; and generating confidence intervals for the control signals to determine causal relationships between the control signals and the measurable parameters. The method can include operating the vehicle using at least the control signals determined by the causal relationships to causally affect at least one of the measurable parameters.

In some aspects of the present description, a method of operating a vehicle is provided. The operation of the vehicle can use a plurality of control signals and have a plurality of associated measurable parameters. The method can include determining optimum values for the plurality of control signals operating within an optimum operational range. Determining the optimum values can include: receiving a set of operating constraints for the vehicle; generating expected optimum values within an expected optimum operational range based on the received set of operating constraints; iteratively generating control signal values within corresponding operational ranges, such that for at least one iteration, at least one of the control signal values is different than the corresponding control signal value in a previous iteration, and at least one, but not all, of the control signal values is outside the operational range in a previous iteration; for each iteration, measuring values for the one or more measurable parameters; and generating confidence intervals for the control signals to determine a causal relationship between the control signals and the measurable parameters. The method can include operating the vehicle using at least the control signals determined by the causal relationship to causally affect at least one of the measurable parameters.

BRIEF DESCRIPTION OF THE DRAWINGS

FIG. 9 is a schematic illustration of a change in weights used in figures of merit;

FIGS. 10A-10C schematically illustrate distributions of control signals.

FIGS. 12A-12C are schematic illustrations of confidence intervals for control signals; and FIG. 13 is a schematic illustration of a confidence interval for a control signal changing with iteration.

DETAILED DESCRIPTION

Figure 1:
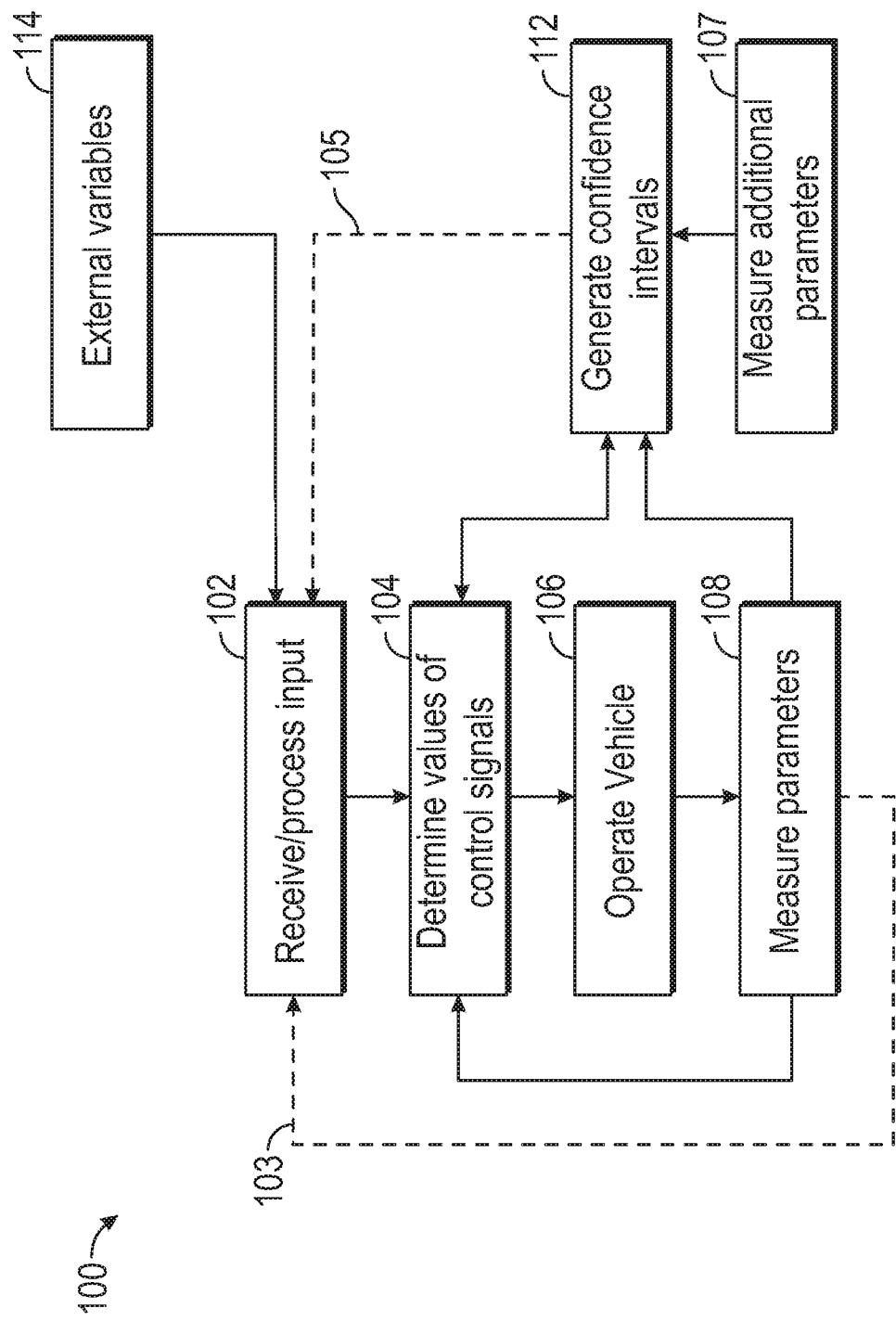
FIG. 1 is a flow diagram schematically illustrating a method of optimizing control signals used in operating a vehicle.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

A vehicle can include a control system which includes Electronic Control Units (ECUs) that receive sensor data (e.g., one or more of engine speed, engine load, engine temperature, vehicle speed, wheel speed, vehicle acceleration, steering angle, or throttle position) and provide control signals for controlling various aspects of the operation of the vehicle (e.g., one or more of air-fuel mixture control, ignition control, idle speed, gearbox, antilock braking system, traction control, or suspension control). The methods described herein can be applied to optimizing the control signals produced by the ECUs. More generally, the methods described herein can be applied to optimizing control signals used in operating a vehicle. In some embodiments, the methods can provide substantially continuous recalibration of each subsystem's parameters to deliver an optimum compromise between range/efficiency; performance and wear; and component life-time, for example.

The operation of the vehicle can have a plurality of associated measurable parameters (e.g., sensor data). Methods, according to some embodiments, include determining a causal relationship between the control signals and the measurable parameters. Such methods may be referred to as causal learning methods. An advantage of the causal learning methods described herein, according to some embodiments, is in determining which variables matter most in determining the appropriate control signals to use when a large amount of data is present (e.g., from a large number of sensors in an automobile). This can improve the efficiency of altering control signals in response to changing conditions (e.g., utilizing less computational power than conventional methods and/or efficiently determining which control signals need to be varied rapidly in responding to a hazardous condition, for example, and which control signals can be varied less frequently). In some embodiments, another advantage of the causal learning methods describe herein are that the methods can be more generalizable than correlational methods, for example, and can provide a sound basis for transfer learning. For example, in some embodiments, when a vehicle utilizing a causal learning method described herein encounters a new situation, it can utilize collaborative causal learning from other vehicles and transfer that learning to quickly update its own learning, thus limiting the risks associated with model extrapolation. Another example of transfer learning is as follows. A vehicle driven in Minnesota is often sold in Florida. In some embodiments, when the vehicle implements a method described herein, it can download calibration value from similar vehicles that have been driven primarily in Florida.

Causation can be measured as a statistically significant difference in measurable parameters associated with changing a control signal while keeping all other control signals constant and blocking external variables/factors known or suspected to covary with the measurable parameters. Differences in measurable parameters can be computed and stored as d-scores, and assessment of the statistical significance can be accomplished by computing a confidence interval around the mean of each d-score distribution, which quantifies the expected value of the causal effect of the change in the control signal and the uncertainty surrounding it (and represents a measure or degree of inference precision). In some cases, determining a causal relationship between control signals and measurable parameters includes determining that there is no statistically significant causal effect of at least one control signal on at least one measurable parameter, and may include determining for at least one other control signal and/or at least one other measurable parameter that there is a statistically significant causal effect of the control signal on the measurable parameter. The causal relationships can be maintained and updated as the method is carried out. In some embodiments, while updating the causal relationships, the method includes repeatedly selecting different values for control signals and measuring the effects of the different values on the measurable parameters. In some embodiments, the method includes generating or selecting values of control signals used in iteratively operating the vehicle, where the control signal values generated or selected in later iterations depend, at least in part, on the causal relationships determined in prior iterations. In some embodiments, optimum values of the control signals are determined, at least in part, based on the confidence intervals. For example, the confidence intervals may indicate that a value of a control signal generates an optimum measured parameter within a range of values specified by the confidence interval.

Methods according to some embodiments include the ability to operate on impoverished input where conditions or interactions are initially unknown, incomplete, or hypothetical estimates and are learned over time through interpretation and adaptive use of confidence intervals, for example. Interpretation and adaptive use of the confidence intervals to automatically understand and exploit the effects of process decisions (changing control signals) allows for transparent and optimum regret management through probability matching, for example. In particular, the computation of confidence intervals can allow for risk-adjusted optimization since this can quantify the best and worst-case expected utility of the process decisions. Methods according to some embodiments can identify and adjust for false inputs (e.g., false assumptions) that would otherwise confound, bias and/or mask cause-and-effect knowledge and limit optimization results, as well as monitor and dynamically adapt to changes in causal relationships between control signals and measurable parameters (e.g., as a result of equipment failure, wear and tear, or change in road or traffic conditions).

Some of the methods described herein are related to those described in U.S. Prov. Pat. Appl. No. 62/818,816 filed Mar. 15, 2019 and titled "Deep Causal Learning for Continuous Testing, Diagnosis, and Optimization".

FIG. 1 is a flow diagram schematically illustrating some embodiments of methods of the present description. The method 100 can include the step 102 of receiving input. The input received can include one or more of operating constraint(s) for the vehicle, an optimum range for each measurable parameter (e.g., a desired range of outcomes for the measurable parameter), a predetermined set of potential optimum values for each control signal, and, optionally, values of external variables 114 (e.g., information regarding at least one of time of day, weather, one or more roads, and traffic). In some embodiments, the input received in step 102 includes input information about a current condition of the vehicle, such as one or more of weight, weight distribution across the vehicle, age, battery status, fuel level, and tire pressure. Step 102 can also include processing the received input. For example, the input may include a predetermined set of potential optimum values for each control signal, and step 102 may include, for each control signal, selecting a plurality of potential optimum values from the predetermined set for the control signal, and arranging the potential optimum values in a predetermined sequence. In some embodiments, at least some of the input information may be provided by, or updated by, one or more measurable parameters in the plurality of measurable parameters as schematically indicated by line 103 (e.g. an operator may adjust process constraints based on the measured parameters to narrow or expand the search space). The measured parameters (e.g., determined in steps 107 and/or 108) from one sequence of operation iterations may be used as input information for a subsequent sequence of operation iterations. In some embodiments, at least some of the input information may be updated based, at least in part, on the confidence intervals as schematically indicated by line 105. For example, one or more operating constraint(s) for the vehicle and/or one or more sets of potential optimum values for the control signals may be updated as information on the causal relationships determined by the method 100 accumulate (e.g. a set of potential optimum values may be updated when the optimum value based on confidence intervals is found to be at the boundary of the current set or range). In some embodiments, the operating constraints include dynamic constraints on the vehicle (e.g., speed constraints given road or traffic conditions determined from steps 107, 108, and/or 114).

The method 100 includes iteratively performing the steps 104, 106, and 108. In step 104, values of control signals are determined. In some embodiments, step 102 includes receiving a predetermined set of potential optimum values for each control signal and selecting a plurality of potential optimum values from the predetermined set of potential optimum values for the control signal. In some embodiments, step 102 further includes arranging the potential optimum values in a predetermined sequence. In step 104, values for the control signals are determined from the potential optimum values. In step 106, the vehicle is operated using the control signals determined in step 104. In step 108, at least some of the measurable parameters are determined. In some embodiments, other measurable parameters are measured after completion of iteratively operating the vehicle. This is schematically illustrated as step 107 in FIG. 1 where additional parameters are measured. In some embodiments, all of the measurable parameters that are measured in the method 100 are measured in step 108, and step 107 is omitted. In other embodiments, all of the measurable parameters that are measured in the method are measured in step 107 and step 108 is omitted (e.g., the data collected while iteratively operating the vehicle may be analyzed after the vehicle has stopped).

The method 100 includes the step 112 of generating confidence intervals, which can be determined from the history of measured parameters and values of the control signals. The confidence intervals may be generated at every step, or may be generated only after a specified number of steps have been carried out, or may be initially generated after a specified number of steps have been carried out and then updated after every subsequent step or after every specified number of steps, or may be generated after completion of iteratively operating the vehicle, for example. The confidence intervals can be used to determine a causal relationship between the control signals and the measurable parameters and, when available, may be used in step 104 in determining the next values of the control signals. If additional measurable parameters are measured in step 107 after completion of iteratively operating the vehicle, these parameters can be used in step 112 in generating or updating confidence intervals that may be utilized when the vehicle is subsequently operated. Even when additional measurable parameters are measured in step 107, confidence intervals for those measurable parameters measured while iteratively operating the vehicle can be determined prior to the completion of iteratively operating the vehicle and may be used in making decisions (e.g., in step 104).

The steps 106 can be operated over a duration sufficient to allow causal effects between the control signals and the measured parameters to be determined. In some embodiments, the duration of the steps 106 varies as the vehicle is iteratively operated. In some embodiments, the duration of a step 106 is be determined based, at least in part, on the previously determined causal relationships. In some embodiments, the duration may vary with the control signal values. In some embodiments, one or more of the control signals may determine a set of protocols for measuring the parameters, which may include different durations (e.g. when there is uncertainty about the length of time it takes for effects to propagate).

In some embodiments, the method 100 includes receiving values, or measuring values, for external variables 114. For example, the external variables 114 can include weather data or information regarding traffic or road conditions. In some embodiments, the external variables 114 can include at least one measured value for at least one measurable parameter of at least one other vehicle. In some embodiments, the method includes determining if d-scores correlate with the external variables 114. If the d-score distributions are determined to correlate with the external variables 114, then confidence intervals can be determined for different ranges of the external variables so that confidence intervals determined from a same range of external variables can be compared. This can reduce or eliminate bias in the cause and effect estimates that would result from these uncontrolled external variables, and can help improve the precision and accuracy of the causal model (the confidence intervals) and allow more granular contextual process control.

Figure 2:
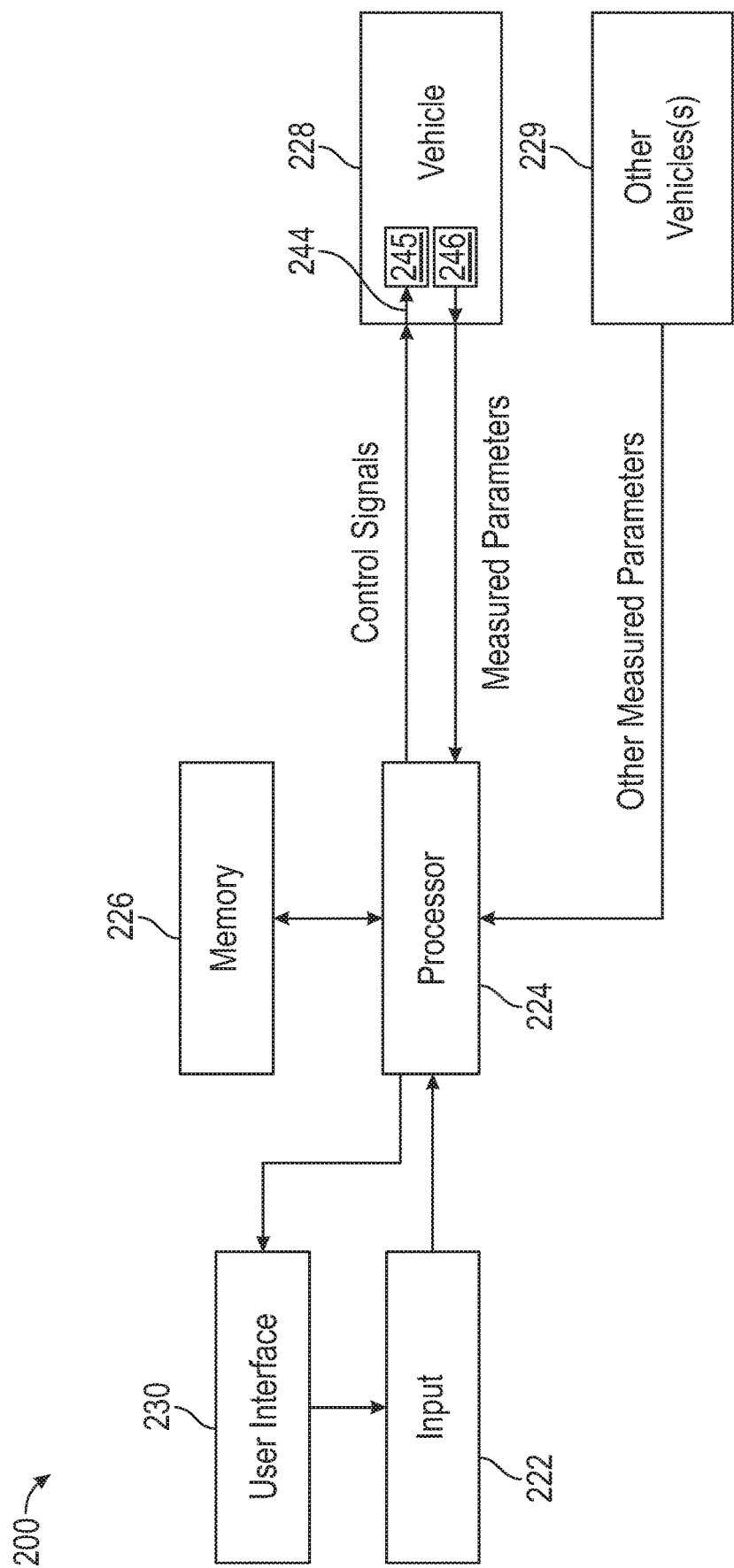
FIG. 2 is a schematic illustration of a system.

FIG. 2 is a schematic illustration of a system 200 for carrying out methods of the present description according to some embodiments. System 200 includes a processor 224 and memory 226. Input 222 (e.g., predetermined sets of potential optimum values of control signals, or any of the input information received in step 102) may be provided through user interface 230, received by the processor 224, and stored in the memory 226. The vehicle 228 receives control signals and provides measured parameters from a plurality of measurable parameters 246 to the processor 224. The processor 224 may iteratively update the control signals and receive updated measured parameters. In some embodiments, at least one measured value for at least one measurable parameter of at least one other vehicle 229 is received while operating the vehicle 228. The processor 224 may store the control signals and the measured parameters in the memory 226. The processor 224 may compute confidence intervals to determine a causal relationship between the control signals and the measurable parameters and/or between the control signals and a figure of merit.

In some embodiments, a method of the present description includes providing memory 226 and a processor 224 coupled to the memory 226, where the processor 224 is configured to: store in the memory 226, for each operation iteration, values of the control signals and the measured parameters; and compute the confidence intervals from the stored values of the control signals and the measured parameters. In some embodiments, the resulting confidence intervals are provided to an operator or user through user interface 230. In some embodiments, user interface 230 includes a display in the vehicle. In some embodiments, the user interface 230 includes a display external to the vehicle which can be connected (wirelessly or wired) to the processor 224.

The vehicle 228 can be any suitable type of vehicle that can utilize control signals. For example, the vehicle 228 can be an automobile, a truck, a van, an airplane, a boat, a bus, or a train.

In some embodiments, at least one control signal 244 in the plurality of control signals controls one or more quantities 245. The one or more quantities 245 may be one or more of speed, acceleration, braking (e.g., at least one control signal 244 may control an antilock braking system), steering, communication to and from an occupant of the vehicle, exterior lighting conditions (e.g., headlights set to high beam, low beam, or off), warning signals, distance to another vehicle, air-fuel mixture, an interior lighting of the vehicle, a sound system, active aerodynamics (e.g., position of front and/or rear spoilers and/or grill shutters), suspension height, traction control, ignition control, idle speed, gearbox state, and sensor processing (e.g., using one or more of LIDAR (light detection and ranging) sensor(s), radar unit(s), sonar unit(s), ultrasonic sensor(s), infrared sensor(s), and camera(s)).

In some embodiments, the measurable parameters 246 include one or more of vehicle slippage, vibration of at least a portion of the vehicle, interior and exterior noise level, wheel speed, vehicle speed, number of times a same warning signal is activated, reaction of an occupant of the vehicle to an activated alarm signal (e.g., as determined by driver steering or breaking reaction), a heart rate of an occupant (e.g., determined using sensors in the steering wheel), distance to another vehicle, fuel efficiency, range (e.g., estimated based on fuel level and fuel efficiency), vehicle reliability (e.g., determined from current information on the operating status of the engine and from past data), driver stress (e.g., as determined by heat rate, other biometric data and/or facial recognition sensors), driver attentiveness (e.g., as determined by frequency of running off or road or drifting outside of lane), driver aggressiveness (e.g., as determined by acceleration and/or braking time), passenger stress (e.g., as determined using biometric sensors and/or facial recognition sensors), passenger comfort (e.g., as determined by a difference is current temperature proximate the passenger and a set temperature and/or as determined facial recognition sensors), and driver response time to one or more control signals (e.g., time to respond to a warning signal).

In some embodiments, a method of operating a vehicle is provided where the method includes optimizing a plurality of control signals used in operating the vehicle according to any of the methods described herein that determine causal relationships; and operating the vehicle using at least the control signals determined by the causal relationships to causally affect at least one of the measurable parameters. The method can be carried out using a system (e.g., including processor 224 and memory 226) in the vehicle. In some embodiments, a vehicle is provided that includes a system (e.g., including processor 224 and memory 226) configured to carry out a method (e.g., of optimizing control signals and/or of operating a vehicle) described herein.

Figure 3:
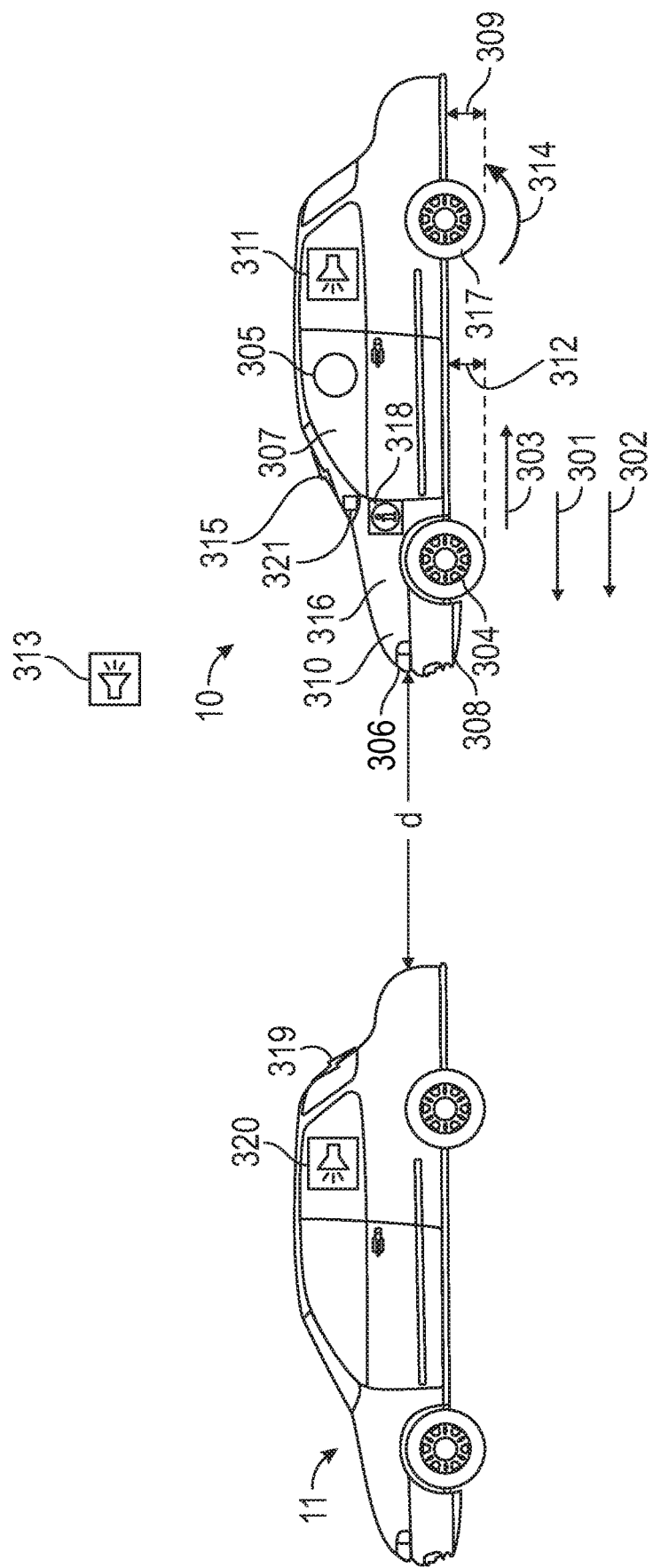
FIG. 3 is a schematic side view of vehicles.

FIG. 3 is a schematic side view of a vehicle 10 illustrating various quantities or parameters that can be at least partially controlled with control signals (e.g., corresponding to quantities 245) and/or that can be measured (e.g., corresponding to measurable parameters 246). The quantities or parameters include vehicle speed 301, acceleration 302, braking 303, steering 304 (e.g., steering angle), communication (e.g., via warning signals 315 and/or via sound system 311, which can include a speaker(s) and microphone(s)) to and/or from an occupant 305 of the vehicle 10, exterior lighting conditions 306, warning signals 315, distance d to another vehicle 11, an interior lighting 307 of the vehicle 10, output of a sound system 311, active aerodynamics 308, suspension height 309, sensor processing 310 (e.g., using a LIDAR sensor which may be disposed under the hood), wheel speed 314, vehicle slippage (e.g., as determined by a difference in vehicle speed 301 and vehicle speed implied by wheel speed 314), tire pressure 317, vibration 312 of at least a portion of the vehicle 10, interior noise level (e.g., as schematically represented by sound system 311), exterior noise level 313, data from biometric system 321, engine/motor properties 316 which may include fuel efficiency, air-fuel mixture, battery status, fuel level, range, engine speed, engine load, engine temperature, throttle position, and/or vehicle reliability. In some embodiments, the method can include receiving information 318 (e.g., as input information or as information received during the operation of the vehicle 10). Information 318 may include input information about a current condition of the vehicle 10, such as weight, weight distribution across the vehicle, and age, for example. Information 318 may include information regarding a driver of the vehicle 10, such as one or more of preferences, age, stress level, and attentiveness, for example.

The warning signals can be vehicle to vehicle, vehicle to and/or from infrastructure (e.g., communication to cloud via cell or sensor on a side of a road), or vehicle to person (e.g., occupant of the vehicle or a pedestrian near the vehicle), for example. The warning signals can be electromagnetic (e.g., a displayed warning signal 315, an infrared signal (e.g., to another vehicle), a radio signal, a cellular signal) or acoustic (e.g., sonic or ultrasonic signals provided by sound system 311. In some embodiments, the warning signals include one or more of an audio (e.g., via sound system 311) or visual (e.g., 315) warning signal to an occupant 305 of the vehicle 10, and an audio (e.g., via sound system 311) or optical (e.g., 315) warning signal to another vehicle 11. In some embodiments, the warning signals include one or more of an acoustic warning signal, an electromagnetic warning signal, a warning signal to an occupant of the vehicle, or a warning signal to another vehicle. Warning signals, such as audio warning signals 320 or optical warning signal 319 can be received from another vehicle 11.

Figure 4:
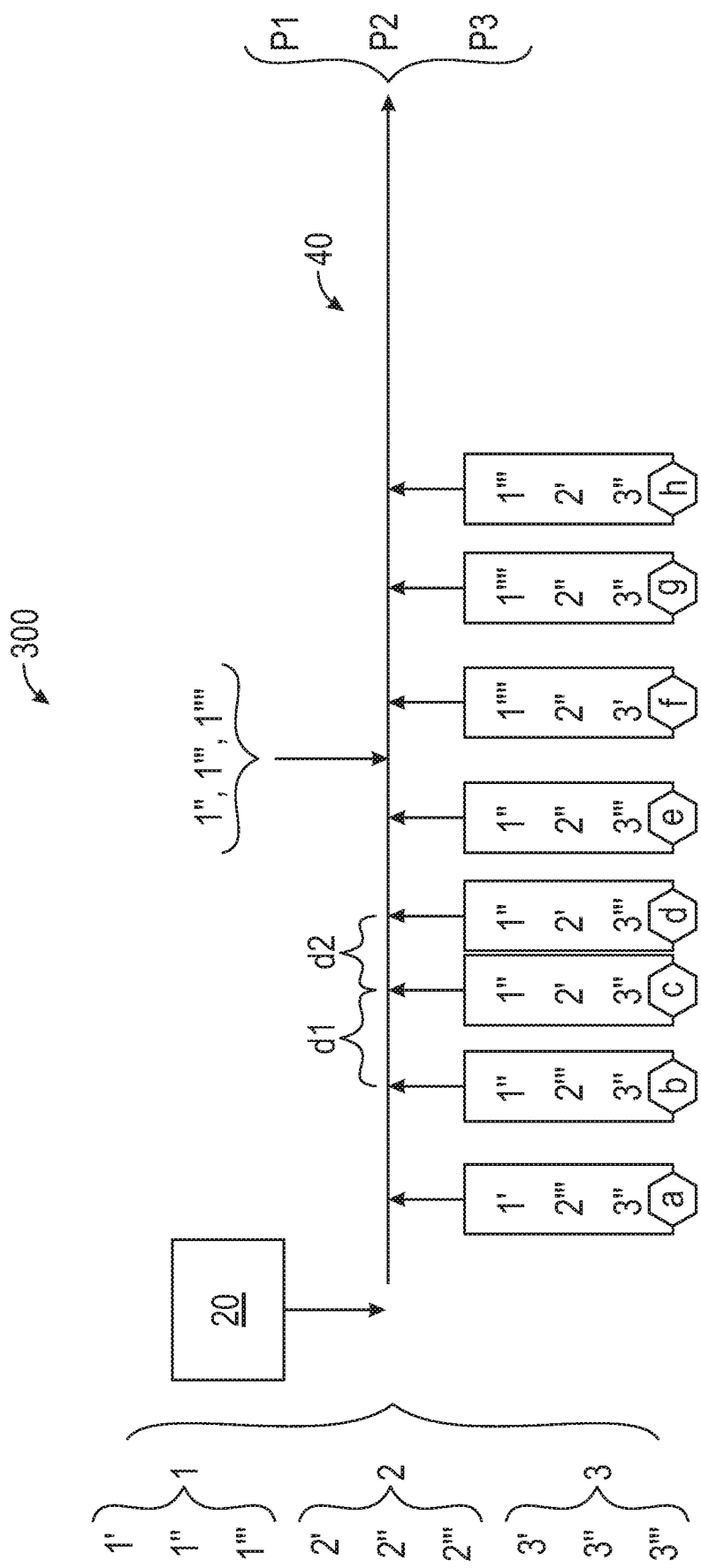
FIGS. 4-5 are schematic illustrations of methods of optimizing a plurality of control signals.
Figure 5:
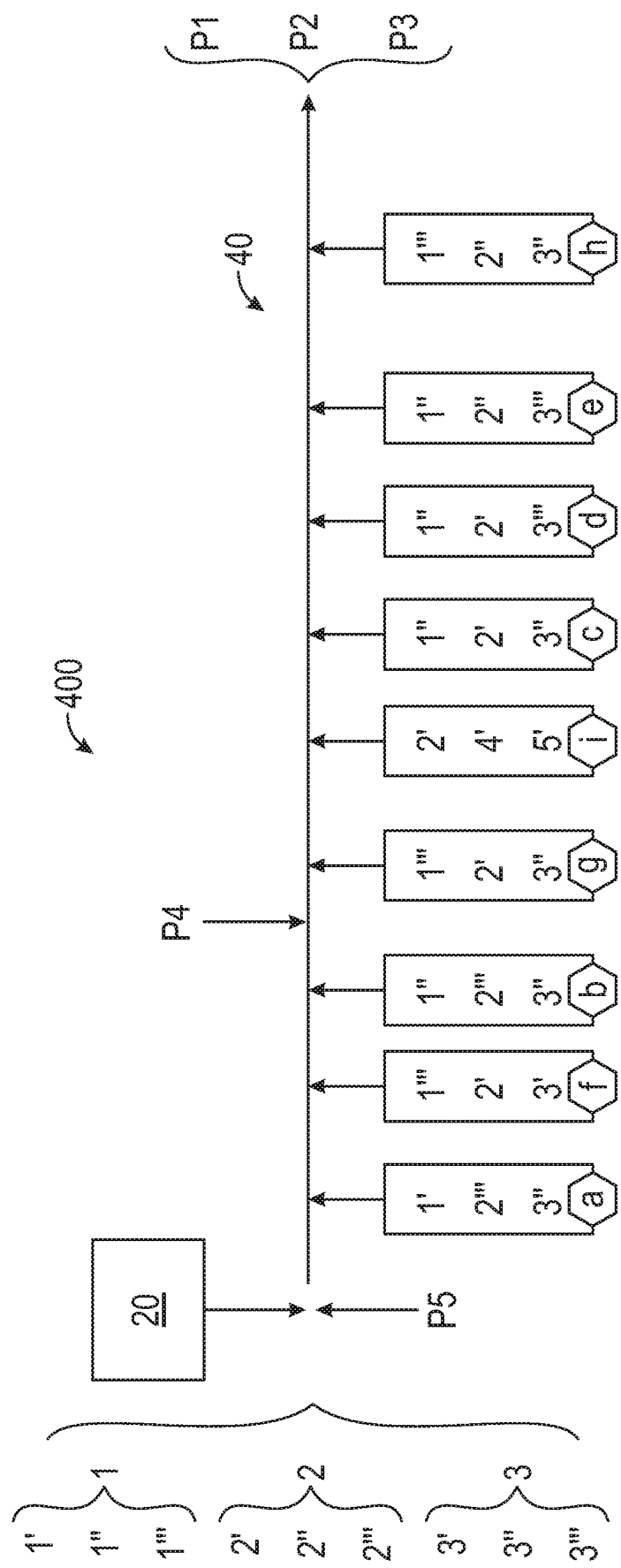

FIGS. 4-5 are schematic illustrations of methods 300 and 400 of optimizing a plurality of control signals (1-3) used in operating a vehicle. The operation 40 of the vehicle has a plurality of associated measurable parameters (P1-P3).

In some embodiments, the methods 300 and/or 400 include: for each control signal (e.g., 1), selecting a plurality of potential optimum values (e.g., 1', 1", 1'") from a predetermined set (e.g., 51 or 52 depicted in FIGS. 6A-6B) of potential optimum values (e.g., 1a-1l) for the control signal, and arranging the potential optimum values in a predetermined sequence; operating the vehicle in at least a first sequence (a, b, c, d, e) of operation iterations, where for each pair of sequential first (e.g., a) and second (e.g., b) operation iterations in the first sequence of operation iterations, the potential optimum value (e.g., 1') of one selected (e.g., randomly selected, or otherwise selected, prior to the second operation iteration) control signal (e.g., 1) in the first operation iteration is replaced in the second operation iteration with the next potential optimum value (e.g., 1") of the selected control signal in the corresponding predetermined sequence of the potential optimum values, while the potential optimum values (e.g., 2'", 3") of the remaining control signals (e.g., 2, 3) in the first operation iteration are maintained in the second operation iteration.

In some embodiments, the methods 300 and/or 400 include: for each control signal (e.g., 1), selecting a plurality of potential optimum values (e.g., 1', 1", 1'") from a predetermined set (e.g., 51 or 52 depicted in FIGS. 6A-6B) of potential optimum values (e.g., 1a-1l) for the control signal; operating the vehicle in at least a first sequence (a, b, c, d, e) of operation iterations, where for each pair of sequential first (e.g., a) and second (e.g., b) operation iterations in the first sequence of operation iterations, the potential optimum value (e.g., 1') of one control signal (e.g., 1) in the first operation iteration is replaced in the second operation iteration with another potential optimum value (1") of the one control signal in the corresponding plurality of potential optimum values, while the potential optimum values (e.g., 2'", 3") of the remaining control signals (e.g., 2, 3) in the first operation iteration are maintained in the second operation iteration. In some embodiments, the method may look back to find pairs of operation iterations from which it can compute d-scores. For example, given an iteration "b", the method can look back to see if it can find an appropriate iteration "a" (e.g., having only one control signal with a different value from that of iteration "b" where the value of the one control signal between the iterations differs by one unit) from which a d-score can be computed.

In some embodiments, for each control signal, the potential optimum values are randomly selected from the predetermined set of potential optimum values for the control signal. In some embodiments, the potential optimum values (e.g., the predetermined set of potential optimum values or the plurality of values selected from the set) can be selected to optimize learning (e.g., explore values that have not been explored much in the past and hence have wide confidence intervals) or to optimize overall performance (e.g., exploit values with higher expected utility as determined by the overlap between the confidence intervals).

The method further includes for each operation iteration in at least the first sequence of operation iterations, measuring each parameter in the plurality of measurable parameters; and generating confidence intervals for the control signals to determine causal relationships between the control signals and the measurable parameters.

In some embodiments, operating the vehicle in at least the first sequence of operation iterations, further includes operating the vehicle in a second sequence (f, g, h) of operation iterations. In some embodiments, for each pair of sequential first (e.g., f) and second (e.g., g) operation iterations in the second sequence of operation iterations, the potential optimum value (e.g., 3') of one selected control signal (e.g., 3) in the first operation iteration is replaced in the second operation iteration with another potential optimum value of the selected control signal (e.g., with the next potential optimum value (e.g., 3") of the control signal in the corresponding predetermined sequence of the potential optimum values), while the potential optimum values of the remaining control signals (e.g., 1, 2) in the first operation iteration are maintained in the second operation iteration. In some embodiments, as illustrated in FIG. 5, at least one operation iteration (e.g., f) in the second sequence of operation iterations is performed between two operation iterations (e.g., a, b) in the first sequence of operation iterations. In some embodiments, as illustrated in FIG. 4, the second sequence of operation iterations (f, g, h) is performed after the first sequence of operation iterations (a, b, c, d, e). In some embodiments, operating the vehicle in at least the first sequence of operation iterations further includes operating the vehicle for at least one operation iteration not in the first sequence of operation iterations (e.g., operation iteration i depicted in FIG. 5 or any of the operation iterations in the second sequence that is not in the first sequence). The at least one operation iteration not in the first sequence of operation iterations can use control signals different from those used in the first sequence of operation iterations. For example, operation iteration i depicted in FIG. 5 uses control signals 4 and 5 taking the values 4' and 5'.

In some embodiments, while operating the vehicle, for at least one control signal, the selected plurality of potential optimum values is changed. This is schematically illustrated in FIG. 4 where after operation iteration e begins and before operation iteration f starts, the plurality of potential optimum values of control signal 1 is changed to 1'', 1'''. and 1''''. In some embodiments, the changed potential optimum values are selected from a subset of the predetermined set of potential optimum values for the control signal, where the subset is selected based, at least in part, on stored values of the measurable parameters and/or on stored values of the confidence intervals. In some embodiments, the subset is selected to meet dynamic constraints on the vehicle. For example, the predetermined set may be the set 51 depicted in FIG. 6A, and the subset 51' may be the values (1e, 1f, 1g, 1h, 1i) as schematically illustrated in FIG. 6C. In some embodiments, the changed potential optimum values are randomly selected from the subset. In some embodiments, based on measurements of each measurable parameter in the plurality of measurable parameters, a potential optimum value (e.g., 1') of a control signal is replaced with another potential optimum value (e.g., 1'''') from the predetermined set of potential optimum values for the control signal. In some embodiments, the potential optimum value and the other potential optimum value are two different types of warning signals (e.g., one warning signal can be a displayed warning signal (e.g., 315) and the other warning signal can be an audio signal produced by sound system 311). In some embodiments, based on measurements of each parameter in the plurality of measurable parameters, a control signal in the plurality of control signals is replaced with another control signal in the plurality of control signals (e.g., a first control signal that is varied in the first sequence of operation iterations can be replaced with a second control signal that is not varied in the first sequence of operation iterations such that after the replacement, the second control signal is varied and the first control signal is not varied). In some embodiments, the control signal and the other control signal control two different types of warning signals. For example, based on measurements of each measurable parameter in the plurality of measurable parameters, the method may determine that a first control signal, or first control signal value, indicating a first warning signal is unwarranted but a different second control signal, or control signal value, indicating a different second warning signal is needed.

In some embodiments, a potential optimum value (e.g., 1') of a control signal is replaced with a new potential optimum value (e.g., 1'''') where the new potential optimum value is obtained by interpolation between two previous potential optimum values. The causal learning for the new value can be initialized by determining an initial d-score for the new value by averaging the d-scores of the two previous potential optimum values (or utilizing a regression technique to obtain the d-score for the new value), for example.

In some embodiments, at least one operation iteration in the first sequence of operation iterations is carried out for a duration different from that of at least one other operation iteration. For example, operation iteration b may be carried out for a duration d1 and operation iteration c may be carried out for a duration d2, where d1>d2 as schematically illustrated in FIG. 4. In some embodiments, a duration of at least one later operation iteration (e.g., c) is determined based, at least in part, on measurable parameters measured in at least one earlier operation iteration (e.g., b) and/or on confidence intervals. In some embodiments, the duration may depend on whether or not a warning signal has been received or generated. In some embodiments, the duration is specified by a control signal. In some embodiments, multiple durations can be measured within the same iteration. For example, when characterizing the dynamic nature of the causal effect, each measurable parameter can be measured at different durations to understand how the effect propagates.

In some embodiments, as schematically illustrated in FIG. 5, the method (e.g., method 100, 300, 400, or 500 (see FIG. 11)) includes receiving at least one measured value V4 for at least one measurable parameter of at least one other vehicle while operating the vehicle. In some embodiments, as schematically illustrated in FIG. 5, the method (e.g., method 100, 300, 400, or 500) includes receiving at least one measured value V5 for at least one measurable parameter of at least one other vehicle prior to iteratively operating the vehicle. The at least one measured value V4 and/or V5 may be obtained from a cell connection or satellite connection, for example. In some embodiments, the at least one measured value includes a location of a road hazard or traffic condition encountered by the other vehicle.

Figure 6A:
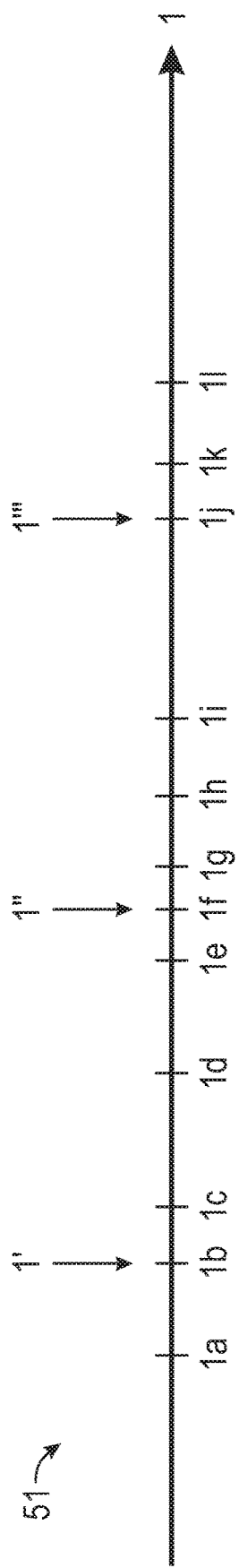
FIGS. 6A-6B are schematic illustrations of predetermined sets of potential optimum values of control signals.
Figure 6B:
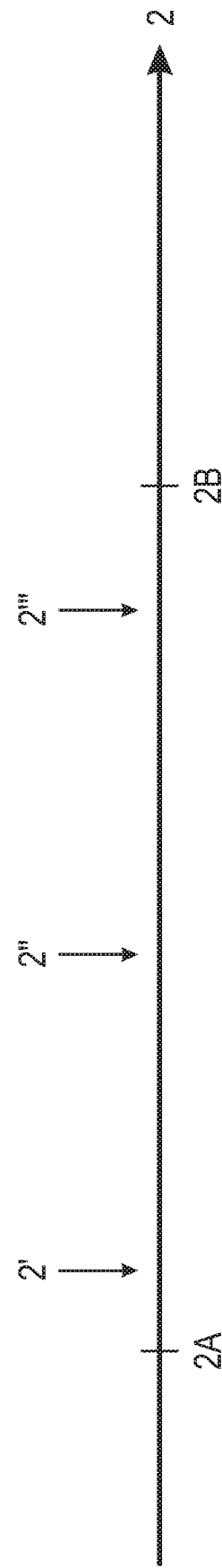
Figure 6C:
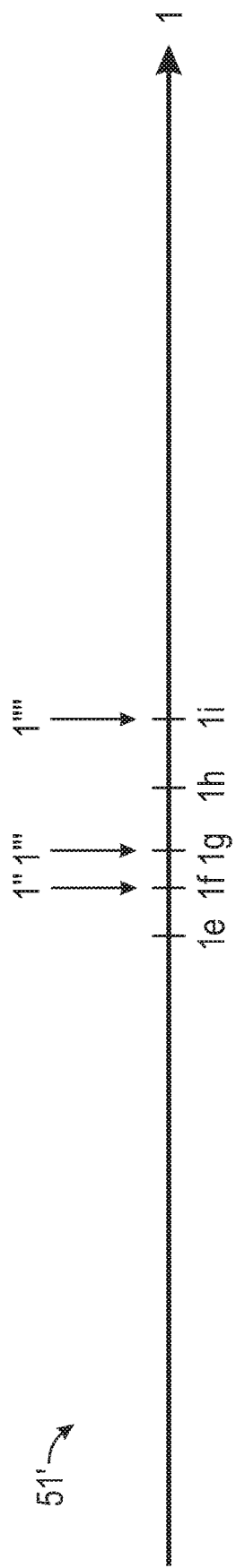
FIG. 6C is a schematic illustration of a subset of potential optimum values of a control signal.

As schematically illustrated in FIGS. 6A-6C, in some embodiments, the potential optimum values (e.g., 1', 1'', 1''') for each control signal (e.g., control signal 1) are selected from a predetermined set 51, 52, 51' of potential optimum values (e.g., 1a-1l) for the control signal. In some embodiments, for each control signal, the plurality of potential optimum values of the control signal is randomly selected (e.g., randomly selected based on a uniform, Poisson, Gaussian, binomial, or any other distribution) from the predetermined set of potential optimum values. In some embodiments, for each control signal, the plurality of potential optimum values of the control signal is selected to maximize a distance between the selected potential optimum values. As schematically illustrated in FIG. 6B, in some embodiments, for at least one control signal (e.g., control signal 2), the set 52 of potential optimum values is a continuous set (a range of 2A to 2B). In the case of a continuous set, discrete potential optimum values may be selected uniformly or randomly from the set. Alternatively, the continuous range can be divided into subranges and a value can be randomly sampled from each subrange, for example.

In some embodiments, for at least one operation iteration, the value of at least one control signal is selected (e.g., randomly) from a subset (e.g., the subset 1', 1'') of the plurality of potential optimum values. In some embodiments, the subset is selected based, at least in part, on stored values of the measurable parameters and/or stored values of the confidence intervals. In some embodiments, while operating the vehicle, for at least one control signal, the plurality of potential optimum values is changed (see, e.g., FIG. 4). The change may be based, at least in part, on stored values of the measurable parameters and/or stored values of the confidence intervals.

Figure 7A:
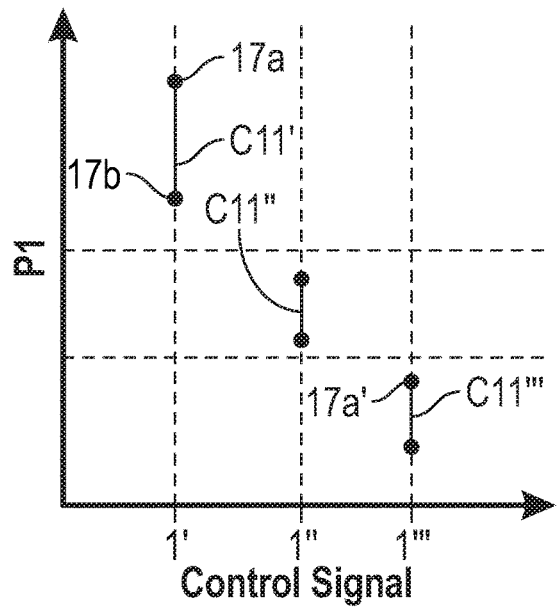
FIGS. 7A-7C are schematic illustrations of confidence intervals for a control signal.
Figure 7B:
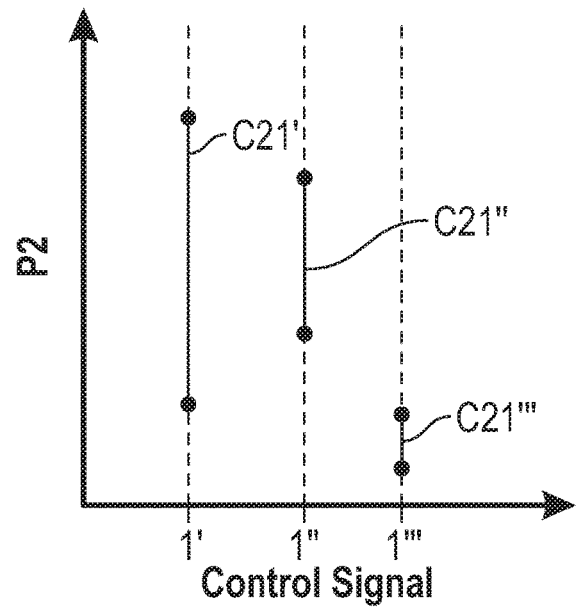
Figure 7C:
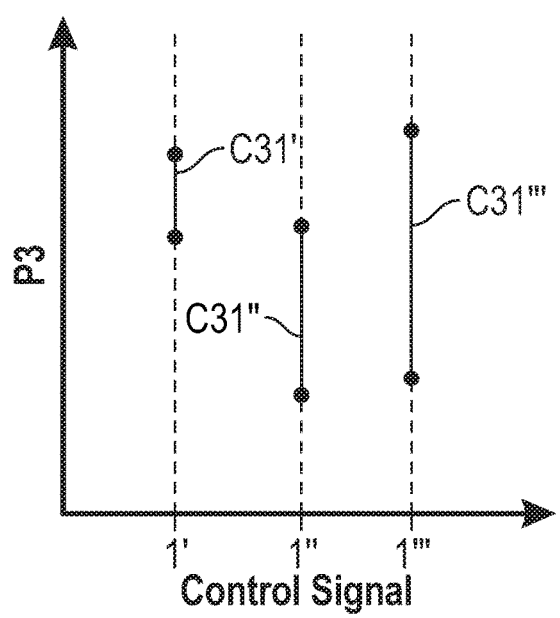

The method (e.g., 100, 300, 400, or 500) can include generating confidence intervals for the control signals to determine a causal relationship between the control signals and the measurable parameters. FIGS. 7A-7C schematically illustrate confidence intervals C11'-C11''', C21'-C21''', and C31'-C31''', respectively, for control signal 1. Cmn is the confidence interval for measurable parameter Pm when control signal n has a given value, which can be, for example, a specified value (e.g., 1', 1'', or 1''') or a value from the most recent iteration. For example, C21'' is the confidence interval for measurable parameter P2 when control signal 1 takes the value 1''. The confidence intervals may be determined for a specified confidence level. For example, the method can include performing a t-test or other statistical hypothesis test to construct a p % confidence interval, where p is a fixed value, e.g., 90%, or 95%, or 97.5%, or 99%.

Generating confidence intervals for the control signals to determine causal relationships between the control signals and the measurable parameters can include generating a confidence interval for at least one measurable parameter for at least some potential optimum values of the control signals. For example, causal relationships between control signals 1, 2, and 3 and measurable parameters P1, P2, and P3 may be that changing control signal 1 from a specified potential optimum value by one unit causes a change in P1 within a first confidence interval and changing control signal 2 from a specified potential optimum value by one unit causes a change in P1 within a second confidence interval. In some embodiments, generating the confidence intervals for the control signals includes generating a confidence interval for each potential optimum value (e.g., 1', 1'', 1''') of each control signal (e.g., control signal 1) to determine a causal relationship between the potential optimum value of the control signal and each measurable parameter (e.g., P1, P2, P3).

In some embodiments, each confidence interval (e.g., C11') includes upper and lower bounds 17a and 17b, and if for a control signal (e.g., control signal 1) in the plurality of control signals, the confidence intervals (e.g., C11', C11'', C11''') for the potential optimum values (e.g., 1', 1'', 1''') of the control signal are non-overlapping, then the optimum value for the control signal is selected as the potential optimum value (e.g., 1') of the control signal that corresponds to the confidence interval (e.g., C11') having the highest lower bound 17b. For example, it may be desired to maximize the measurable parameter characterized by the confidence interval.

In some embodiments, each confidence interval (e.g., C11') includes upper and lower bounds (e.g., 17a and 17b), and if for a control signal (e.g., control signal 1) in the plurality of control signals, the confidence intervals (e.g., C11', C11'', C11''') for the potential optimum values (e.g., 1', 1'', 1''') of the control signal are non-overlapping, then the optimum value for the control signal is selected as the potential optimum value (e.g., 1''') of the control signal that corresponds to the confidence interval (e.g., C11''') having the lowest higher bound 17a'. For example, it may be desired to minimize the measurable parameter characterized by the confidence interval.

In some embodiments, if for a control signal (e.g., control signal 1) in the plurality of control signals, the confidence intervals (e.g., C31', C31'', C31''') for the potential optimum values (e.g., 1', 1'', 1''') of the control signal are overlapping, then the optimum value for the control signal is selected as any of the plurality of potential optimum values (e.g., 1', 1'', 1''') of the control signal. The control signal may be randomly selected from the potential optimum values, or may be selected based on any suitable sampling algorithm for choosing the optimum value. In some embodiments, if for a control signal in the plurality of control signals, the confidence intervals for the potential optimum values of the control signal are overlapping, then the optimum value for the control signal is selected by Thompson sampling or probability matching from the potential optimum values of the control signal. Thompson sampling and probability matching are known in the art and are described, for example, in U.S. Pat. Publ. Nos. 2017/0278114 (Renders), 2017/0109642 (Kawale et al.), 2019/0244110 (Qiu et al.), and U.S. Pat. No. 10,133,983 (Chelian et al.).

Figure 8:
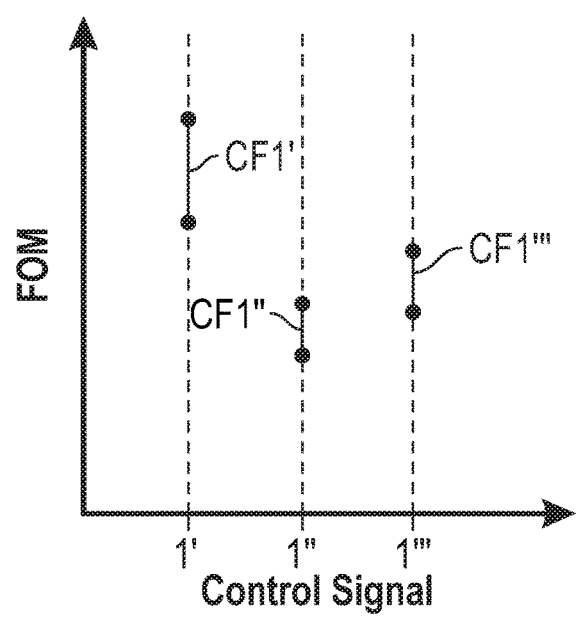
FIG. 8 is a schematic illustration of confidence intervals of a figure of merit for a control signal.

FIG. 8 schematically illustrates confidence intervals for a figure of merit (FOM) which is a function of the measurable parameters. CFn is the confidence interval for the FOM when the control signal n has a given value. Confidence intervals CFn can be determined for each control signal. In some embodiments, generating the confidence intervals for the control signals includes defining a figure of merit as a function of the measurable parameters, and generating a confidence interval (e.g., CFI') for the control signals to determine a causal relationship between the control signals and the figure of merit. In some embodiments, the FOM can further include soft constraints. For example, if a measurable parameter should be greater than 1.2, then a continuous penalty function could be included where the penalty increases exponentially as the measurable parameter falls further below 1.2. In some embodiments, generating the confidence intervals for the control signals includes generating a confidence interval CFn for each potential optimum value of each control signal n. In some embodiments, the figure of merit is or includes a weighted function of the measurable parameters where the weighted function assigns a predetermined weight to each measurable parameter. For example, the FOM may be defined as a P1+b P2+c P3, as indicated in FIG. 9, where each of the values a, b, and c are predetermined weights. In some embodiments, the FOM is a nonlinear function of the measurable parameters. For example, the FOM may be a P1+b $P2^2$+c P3. In some embodiments, while operating the vehicle, the predetermined weight assigned to at least one of the measurable parameters is changed. This is schematically illustrated in FIG. 9, where the weight b used in FOM' is changed to b' in FOM''. For example, if it is determined that a first measurable parameter can shift to values outside a corresponding optimum range without a sufficient corresponding shift in the FOM, the weight assigned to the first measurable parameter can be increased. In some embodiments, the weight(s) are changed because the overall optimization goal has changed (e.g. higher performance vs. lower fuel efficiency).

The FOM can be defined such that a maximum value of the FOM is desired or can be defined such that a minimum value of the FOM is desired. In some embodiments, it is desired to maximize the figure of merit. In some such embodiments, the figure of merit is higher when each measurable parameter is in a corresponding optimum range (e.g., an optimum range for a measurable parameter P1 may be P1 and lower when at least one measurable parameter is outside the corresponding optimum range. In some embodiments, it is desired to minimize the figure of merit. In some such embodiments, the figure of merit is lower when each measurable parameter is in a corresponding optimum range, and higher when at least one measurable parameter is outside the corresponding optimum range.

In some embodiments, the potential optimum value (e.g., 1') of a selected control signal (e.g., 1) in the first operation iteration is replaced in the second operation iteration with another potential optimum value (e.g., the next potential optimum value (e.g., 1'') of the selected control signal in the corresponding predetermined sequence of the potential optimum values), while values of the remaining control signals are maintained. In some embodiments, the selected control signal is randomly selected from the plurality of control signals. In some embodiments, the selected control signal is randomly selected based on a distribution of the control signals in the plurality of control signals. FIGS. 10A-10C schematically illustrate three possible distributions 53, 53', and 53". Distribution 53 assigns an equal weight to each control signal so that when the control signal is selected based on the distribution 53, each control signal is equally likely to be selected. Distribution 53' assigns a higher weight to control signal 2 and lower weights to control signals 1 and 3 so that when the control signal is selected based on the distribution 53', control signal 2 is more likely to be selected than the other control signals. This may be desired if the method determines that control signal 2 is more important than the other control signals in determining a desired measurable parameter or if the confidence intervals for the other control signals are below a threshold, for example. In some embodiments, while operating the vehicle, the distribution is modified (e.g., from 53 to 53'). In some embodiments, for at least one operation iteration, the selected control signal is selected from a subset (e.g., the subset 1, 2) of the plurality of control signals. For example, the distribution 53" schematically illustrated in FIG. 13C may be used, which assigns a zero probability to control signal 3 so that a control signal selected based on the distribution 53" is selected from the subset (1,2). In some embodiments, the subset is selected based, at least in part, on the measurable parameters measured in a previous operation iteration and/or on confidence intervals. In some embodiments, the selected control signal is randomly selected from the subset.

In some embodiments, the method includes arranging the potential optimum values (e.g., 1', 1", 1''') in a predetermined sequence (e.g., 1', 1", 1'''). The predetermined sequence may be ordered to facilitate d-score calculations (e.g., to maximize the likelihood of being able to compute a d-score with each iteration). The sequence may continue in reverse after the last potential optimum value is reached (e.g., the sequence may be 1', 1", 1''', 1", 1', 1", . . . ), so that for each potential optimum value, the next potential optimum value is defined and can be close (e.g., differing by one unit) to the potential optimum value.

In some embodiments, the method can include dynamically and substantially seamlessly adding/dropping control signals and/or adding/dropping control values for an existing control signal (updating the search space) based on causal knowledge of their causal effects and changing operational constraints. In some embodiments, to run the method while driving a vehicle, for example, it may be desired to keep the operational range small (e.g., so that variations in control signals are more like perturbations than design of experiment variations). In some such embodiments, the optimum control signal values are often outside the initial range. In some embodiments, the method can iteratively adjust the operational range toward the optimum operational range.

Figure 11:
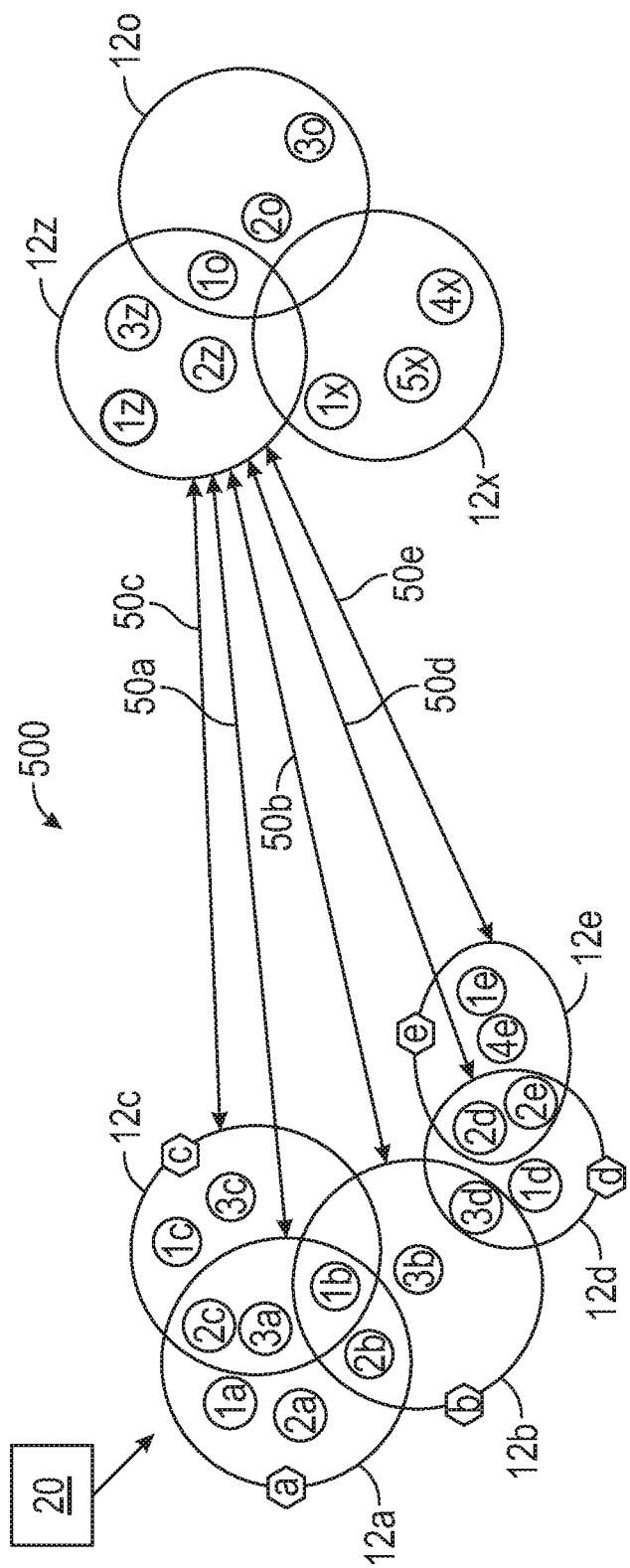
FIG. 11 is a schematic illustration of a method of optimizing a plurality of control signals.

FIG. 11 is a schematic illustration of a method 500. In some embodiments, the method 500 is a method of determining optimum values (e.g., 1o, 2o, 3o) for a plurality of control signals (e.g., 1, 2, 3) used in operating a vehicle and operating within an optimum operational range 12o. In some embodiments, the method 500 includes receiving a set of operating constraints 20 for the vehicle; generating expected optimum values (e.g., 1z, 2z, 3z) within an expected optimum operational range 12z based on the received set of operating constraints; and iteratively (a-e) generating control signal values (e.g., 1a-e, 2a-e, 3a-e) within corresponding operational ranges (12a-e), such that for at least one iteration (e.g., d), at least one of the control signal values (e.g., at least one of 1d, 2d, 3d) is different than the corresponding control signal value (e.g., 1a, 2a, 3a) in a previous iteration (e.g., a), and at least one (e.g., at least one of 1d, 2d), but not all, of the control signal values is outside the operational range (e.g., 12b) in a previous iteration (e.g., b). Generating the expected optimum values can include generating the expected optimum values such that the operating constraints are expected (e.g., based on knowledge available at the time the expected optimum values are generated) to be satisfied.

In some embodiments, the operation the operation of the vehicle 10 has one or more associated measurable parameters (e.g., P1-P3). In some embodiments, the method 500 further includes receiving optimum ranges for one or more measurable parameters (e.g., P1-P3), where the optimum ranges are expected to result from the control signals (e.g., 1, 2, 3) operating within the expected optimum operational range 12z. In some embodiments, the method 500 includes for each iteration, measuring values for the one or more measurable parameters. In some embodiments, the method 500 further includes generating confidence intervals for the control signals to determine a causal relationship between the control signals and the measurable parameters. For example, the method 500 may generate the confidence intervals C11-C13, C21-C23, C31-C33 schematically illustrated in FIGS. 12A-12C, which are confidence intervals for d-scores defined as a difference between a measurable parameter when the control signal value is selected randomly and when it is selected by probability matching, which is a measure of how much operational benefit that control signal variable delivers for that measurable parameter. As schematically illustrated in FIG. 13, the confidence intervals (e.g., C21) can change with operation iteration. This can occur due to increasing available data that can be used to determine the confidence intervals and/or due to changes in the value of the control signals. In some embodiments, the value of a control signal is not further modified after it has suitably converged to an optimum value. In some embodiments, while operating the vehicle, a control signal (e.g., control signal 1) in the plurality of control signals is no longer modified when the confidence interval (e.g., C21) for the control signal corresponding to at least one of the one or more measurable parameters (e.g., P2) is smaller than a predetermined confidence interval threshold (e.g., T21). For example, once the confidence interval, which represents the difference between the measurable parameter in baseline (random sampling of all possible values/levels) vs. exploit (consistently selecting the optimum value/level), is small, it may be desired to stop sampling the baseline and exploit 100% of the time.

In some embodiments, after a number of iterations (e.g., a-d), a control signal (e.g., control signal 3) in the plurality of control signals is eliminated when performing further iterations (e.g., e). In some such embodiments, or in other embodiments, after a number of iterations (e.g., a-d), a new control signal (e.g., control signal 4) is included when performing further iterations (e.g., e). The number of iterations is a positive number that is typically sufficiently large for the method to have generated at least some knowledge of the causal effects of the control signals on the measurable outcomes. In some embodiments, at least one measurable parameter (e.g., P1) is measured while iteratively generating control signal values; and at least one other measurable parameter (e.g., P2) is measured after a completion of iteratively generating control signal values, as described further elsewhere.

The expected optimum operational range $12z$ may be generated based on prior knowledge of the vehicle (e.g., based on an existing causal model established during a prior implementation of a method described herein) and/or based on the received set of operating constraints 20. For example, the expected optimum operational range $12z$ may be an operational range consistent with the received operating constraints that previously resulted in optimum, or at least desired, results. In some embodiments, while iteratively generating control signal values, at least one of the constraints in the set of operating constraints is modified. The expected optimum operational range $12z$ may be updated based on information generated by the method 500. In some embodiments, the method 500 further includes quantifying a gap (e.g., $50a$-$e$) between the expected optimum operational range $12z$ and the operational range (e.g., $12a$-$e$) in each iteration. For example, the gaps can be quantified in terms how rapidly control signal values vary (e.g., how often they change value, or how far are they from settling into an optimum value). This may be carried out analogously to Newton's method for determining a gap between a current estimate for a root and the estimate at the next iteration. For example, a figure of merit as a function of measurable parameters can be defined such that the optimum value of the figure of merit is zero. The gap may then be quantified as the current value of the figure of merit divided by the change in the figure of merit from its value in the previous iteration. In some embodiments, the gap (e.g., $50c$) for at least one iteration (e.g., iteration c) is smaller than the gap (e.g., $50a$) for at least one previous iteration (e.g., iteration a).

In some embodiments, the optimum operational range $12o$ is different than the expected optimum operational range $12z$. In some embodiments, after optimizing the control signals by determining the optimum values for the control signals, the optimized control signals (e.g., 1, 4, 5) operate within an optimized operational range $12x$ different than the optimum operational range $12o$ and the expected optimum operational range $12z$. For example, the optimum operational range $12o$ may be an ideal operational range, while the optimized operational range $12x$ resulting from performing the method 500 may account for limitations such as non-ideal external variables (e.g., wet or icy roads) and can therefore differ from the optimum operational range $12o$. In some embodiments, the expected optimum operational range $12z$ and the optimized operational range $12x$ differ (e.g., due to incomplete convergence).

In some embodiments, the method 500 is a method of determining an optimum operational range $12o$ for a plurality control signals (e.g., 1, 2, 3) used in operating a vehicle, and operating and having corresponding values (e.g., $1o$, $2o$, $3o$) in the optimum operational range. In some embodiments, the method 500 includes receiving a set of operating constraints 20 for the vehicle; generating an expected optimum operational range $12z$ for the control signals based on the received set of operating constraints where the control signals are expected to operate and have corresponding values (e.g., $1z$, $2z$, $3z$) in the expected optimum operational range; generating a first operational range (e.g., $12a$) for the control signals operating and having corresponding values (e.g., $1a$, $2a$, $3a$) in the first operational range; quantifying a first gap (e.g., $50a$) between the first operational range (e.g., $12a$) and the expected optimum operational range $12z$; and modifying at least one (e.g., at least one of $1a$, $2a$, $3a$) of the control signals operating in the first operational range to form a second operational range (e.g., $12b$) for the control signals operating and having corresponding values (e.g., $1b$, $2b$, $3b$) in the second operational range (e.g., $12b$) so that at least one (e.g., $3b$), but not all, of the control signal values is outside the first operational range, and a second gap (e.g., $50b$) between the second operational range and the expected optimum operational range is less than the first gap. In some such embodiments, the optimum operational range $12o$ is different than the expected optimum operational range $12z$.

In some embodiments, the method 500 is performed iteratively (e.g., $12a$-$e$) with the second operational range (e.g., $12b$) determined in a first iteration being used as the first operational range for a next second iteration where the second iteration determines another second operational range (e.g., $12c$). In some embodiments, the optimum control signal values may be outside the initial operational range and the method can iteratively adjust the operational range toward the optimum operational range while the vehicle is operated.

In some embodiments, a method of operating a vehicle is provided where the operation of the vehicle uses a plurality of control signals and has one or more (e.g., a plurality) associated measurable parameters. The method can include optimizing the plurality of control signals (e.g., according to any one of methods 100, 300, 400, or 500) where the optimization includes generating confidence intervals for the control signals to determine causal relationships between the control signals and the measurable parameters. The method can further include operating the vehicle using (e.g., optimized values of) at least the control signals determined by the causal relationships to causally affect at least one of the one or more measurable parameters.

The following is a list of exemplary embodiments of the present description.

A first embodiment is a method of optimizing a plurality of control signals used in operating a vehicle, the operation having a plurality of associated measurable parameters, the method comprising:

for each control signal, selecting a plurality of potential optimum values from a predetermined set of potential optimum values for the control signal, and arranging the potential optimum values in a predetermined sequence;

operating the vehicle in at least a first sequence of operation iterations, wherein for each pair of sequential first and second operation iterations in the first sequence of operation iterations, the potential optimum value of one selected control signal in the first operation iteration is replaced in the second operation iteration with the next potential optimum value of the selected control signal in the corresponding predetermined sequence of the potential optimum values, while the potential optimum values of the remaining control signals in the first operation iteration are maintained in the second operation iteration;

for each operation iteration in at least the first sequence of operation iterations, measuring each parameter in the plurality of measurable parameters; and generating confidence intervals for the control signals to determine causal relationships between the control signals and the measurable parameters.

A second embodiment is the method of the first embodiment, wherein operating the vehicle in at least the first sequence of operation iterations, further comprises operating the vehicle in a second sequence of operation iterations, wherein for each pair of sequential first and second operation iterations in the second sequence of operation iterations, the potential optimum value of one selected control signal in the first operation iteration is replaced in the second operation iteration with the next potential optimum value of the selected control signal in the corresponding predetermined sequence of the potential optimum values, while the potential optimum values of the remaining control signals in the first operation iteration are maintained in the second operation iteration.

A third embodiment is the method of the second embodiment, wherein at least one operation iteration in the second sequence of operation iterations is performed between two operation iterations in the first sequence of operation iterations.

A fourth embodiment is the method of the first embodiment, wherein operating the vehicle in at least the first sequence of operation iterations further comprises operating the vehicle for at least one operation iteration not in the first sequence of operation iterations.

A fifth embodiment is the method of any one of the first through fourth embodiments, wherein at least one operation iteration in the first sequence of operation iterations is carried out for a duration different from that of at least one other operation iteration in the first sequence of operation iterations.

A sixth embodiment is the method of any one of the first through fifth embodiments, wherein the selected control signal is randomly selected based on a distribution of the control signals in the plurality of control signals.

A seventh embodiment is the method of the sixth embodiment, wherein, while operating the vehicle, the distribution is modified.

An eighth embodiment is the method of any one of the first through seventh embodiments, wherein generating the confidence intervals for the control signals comprises generating a confidence interval for each potential optimum value of each control signal to determine a causal relationship between the potential optimum value of the control signal and each measurable parameter.

A ninth embodiment is the method of any one of the first through eight embodiments, wherein generating the confidence intervals for the control signals comprises: defining a figure of merit as a function of the measurable parameters; and generating a confidence interval for the control signals to determine a causal relationship between the control signals and the figure of merit.

An tenth embodiment is the method of any one of the first through ninth embodiments, wherein at least one control signal in the plurality of control signals controls one or more of speed, acceleration, braking, steering, communication to and from an occupant of the vehicle, exterior lighting conditions, warning signals, distance to another vehicle, air-fuel mixture, an interior lighting of the vehicle, a sound system, active aerodynamics, suspension height, and sensor processing.

A eleventh embodiment is the method of any one of the first through tenth embodiments, wherein the measurable parameters include one or more of vehicle slippage, vibration of at least a portion of the vehicle, interior and exterior noise level, wheel speed, vehicle speed, number of times a same warning signal is activated, reaction of an occupant of the vehicle to an activated alarm signal, a heart rate of an occupant, distance to another vehicle, fuel efficiency, range, vehicle reliability, driver stress, driver attentiveness, driver aggressiveness, passenger stress, passenger comfort, and driver response time to one or more control signals.

A twelfth embodiment is a method of operating a vehicle, the method comprising: optimizing a plurality of control signals used in operating the vehicle according to the method of any one of the first through eleventh embodiments; and operating the vehicle using at least the control signals determined by the causal relationships to causally affect at least one of the measurable parameters.

A thirteenth embodiment is a method of optimizing a plurality of control signals used in operating a vehicle, the operation having a plurality of associated measurable parameters, the method comprising:
for each control signal, selecting a plurality of potential optimum values from a predetermined set of potential optimum values for the control signal;
operating the vehicle in at least a first sequence of operation iterations, wherein for each pair of sequential first and second operation iterations in the first sequence of operation iterations, the potential optimum value of one control signal in the first operation iteration is replaced in the second operation iteration with another potential optimum value of the one control signal in the corresponding plurality of potential optimum values, while the potential optimum values of the remaining control signals in the first operation iteration are maintained in the second operation iteration;
receiving at least one measured value for at least one measurable parameter of at least one other vehicle while operating the vehicle;
for each operation iteration in at least the first sequence of operation iterations, measuring each parameter in the plurality of measurable parameters; and
generating confidence intervals for the control signals to determine causal relationships between the control signals and the measurable parameters.

A fourteenth embodiment is a method of determining optimum values for a plurality of control signals used in operating a vehicle and operating within an optimum operational range, the method comprising:
receiving a set of operating constraints for the vehicle;
generating expected optimum values within an expected optimum operational range based on the received set of operating constraints; and
iteratively generating control signal values within corresponding operational ranges, such that for at least one iteration, at least one of the control signal values is different than the corresponding control signal value in a previous iteration, and at least one, but not all, of the control signal values is outside the operational range in a previous iteration.

A fifteenth embodiment is the method of the fourteenth embodiment, wherein the operation of the vehicle has one or more associated measurable parameters, the method further comprising: for each iteration, measuring values for the one or more measurable parameters; and generating confidence intervals for the control signals to determine a causal relationship between the control signals and the one or more measurable parameters.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A method of optimizing a plurality of control signals used in operating a vehicle, the operation having a plurality of associated measurable parameters, the method comprising:
for each control signal, selecting a plurality of potential optimum values from a predetermined set of potential optimum values for the control signal, and arranging the potential optimum values in a predetermined sequence;
operating the vehicle in at least a first sequence of operation iterations, wherein for each pair of sequential first and second operation iterations in the first sequence of operation iterations, the potential optimum value of one selected control signal in the first operation iteration is replaced in the second operation iteration with the next potential optimum value of the selected control signal in the corresponding predetermined sequence of the potential optimum values, while the potential optimum values of the remaining control signals in the first operation iteration are maintained in the second operation iteration;
for each operation iteration in at least the first sequence of operation iterations, measuring each parameter in the plurality of measurable parameters; and
generating confidence intervals for the control signals to determine causal relationships between the control signals and the measurable parameters, wherein the confidence intervals quantify expected values of causal effects of a change in control signals and in uncertainty surrounding expected values of effects.

2. The method of claim 1, wherein operating the vehicle in at least the first sequence of operation iterations, further comprises operating the vehicle in a second sequence of operation iterations, wherein for each pair of sequential first and second operation iterations in the second sequence of operation iterations, the potential optimum value of one selected control signal in the first operation iteration is replaced in the second operation iteration with the next potential optimum value of the selected control signal in the corresponding predetermined sequence of the potential optimum values, while the potential optimum values of the remaining control signals in the first operation iteration are maintained in the second operation iteration.

3. The method of claim 2, wherein at least one operation iteration in the second sequence of operation iterations is performed between two operation iterations in the first sequence of operation iterations.

4. The method of claim 1, wherein operating the vehicle in at least the first sequence of operation iterations further comprises operating the vehicle for at least one operation iteration not in the first sequence of operation iterations.

5. The method of claim 1, wherein at least one operation iteration in the first sequence of operation iterations is carried out for a duration different from that of at least one other operation iteration in the first sequence of operation iterations.

6. The method of claim 1, wherein the selected control signal is randomly selected based on a distribution of the control signals in the plurality of control signals.

7. The method of claim 6, wherein, while operating the vehicle, the distribution is modified.

8. The method of claim 1, wherein generating the confidence intervals for the control signals comprises generating a confidence interval for each potential optimum value of each control signal to determine a causal relationship between the potential optimum value of the control signal and each measurable parameter.

9. The method of claim 1, wherein generating the confidence intervals for the control signals comprises:
defining a figure of merit as a function of the measurable parameters; and
generating a confidence interval for the control signals to determine a causal relationship between the control signals and the figure of merit.

10. The method of claim 1, wherein at least one control signal in the plurality of control signals controls one or more of speed, acceleration, braking, steering, communication to and from an occupant of the vehicle, exterior lighting conditions, warning signals, distance to another vehicle, air-fuel mixture, an interior lighting of the vehicle, a sound system, active aerodynamics, suspension height, and sensor processing.

11. The method of claim 1, wherein the measurable parameters include one or more of vehicle slippage, vibration of at least a portion of the vehicle, interior and exterior noise level, wheel speed, vehicle speed, number of times a same warning signal is activated, reaction of an occupant of the vehicle to an activated alarm signal, a heart rate of an occupant, distance to another vehicle, fuel efficiency, range, vehicle reliability, driver stress, driver attentiveness, driver aggressiveness, passenger stress, passenger comfort, and driver response time to one or more control signals.

12. A method of operating a vehicle, the method comprising:
optimizing a plurality of control signals used in operating the vehicle according to the method of claim 1; and
operating the vehicle using at least the control signals determined by the causal relationships to causally affect at least one of the measurable parameters.

13. A method of optimizing a plurality of control signals used in operating a vehicle, the operation having a plurality of associated measurable parameters, the method comprising:
for each control signal, selecting a plurality of potential optimum values from a predetermined set of potential optimum values for the control signal;
operating the vehicle in at least a first sequence of operation iterations, wherein for each pair of sequential first and second operation iterations in the first sequence of operation iterations, the potential optimum value of one control signal in the first operation iteration is replaced in the second operation iteration with another potential optimum value of the one control signal in the corresponding plurality of potential optimum values, while the potential optimum values of the remaining control signals in the first operation iteration are maintained in the second operation iteration;
receiving at least one measured value for at least one measurable parameter of at least one other vehicle while operating the vehicle;
for each operation iteration in at least the first sequence of operation iterations, measuring each parameter in the plurality of measurable parameters; and
generating confidence intervals for the control signals to determine causal relationships between the control signals and the measurable parameters, wherein the confidence intervals quantify expected values of causal effects of a change in control signals and in uncertainty surrounding expected values of effects.

14. A method of determining optimum values for a plurality of control signals used in operating a vehicle and operating within an optimum operational range, the method comprising:

receiving a set of operating constraints for the vehicle;

generating expected optimum values within an expected optimum operational range based on the received set of operating constraints; and iteratively generating control signal values within corresponding operational ranges, such that for at least one iteration, at least one of the control signal values is different than the corresponding control signal value in a previous iteration, and at least one, but not all, of the control signal values is outside the operational range in a previous iteration, wherein the operation of the vehicle has one or more associated measurable parameters, the method further comprising:

for each iteration, measuring values for the one or more measurable parameters; and generating confidence intervals for the control signals to determine a causal relationship between the control signals and the one or more measurable parameters, wherein the confidence intervals quantify expected values of causal effects of a change in control signals and in uncertainty surrounding expected values of effects.

* * * * *